US012771924B2

(12) United States Patent
Jun et al.

(10) Patent No.: US 12,771,924 B2
(45) **Date of Patent: *Oct. 20, 2026**

(54) SNAPSHOT MESSAGES FOR INDICATING USER STATE

(71) Applicant: Snap Inc., Santa Monica, CA (US)

(72) Inventors: Hanseul Jun, Stanford, CA (US); Sven Kratz, Mercer Island, WA (US); Joanne Leong, Markham (CA); Xingyu Liu, Los Angeles, CA (US); Andrés Monroy-Hernández, Seattle, WA (US); Brian Anthony Smith, New York, NY (US); Yu Jiang Tham, Seattle, WA (US); Rajan Vaish, Beverly Hills, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/217,024

(22) Filed: May 23, 2025

(65) Prior Publication Data

US 2025/0287091 A1 Sep. 11, 2025

Related U.S. Application Data

(63) Continuation of application No. 17/890,439, filed on Aug. 18, 2022, now Pat. No. 12,363,419.

(Continued)

(51) Int. Cl.

*H04N 5/232* (2006.01)
*G06V 10/40* (2022.01)

(Continued)

(52) U.S. Cl.

CPC ........... *H04N 23/611* (2023.01); *G06V 10/40* (2022.01); *G06V 20/50* (2022.01); *H04L 51/07* (2022.05); *H04N 13/239* (2018.05)

(58) Field of Classification Search

CPC .... H04N 23/611; H04N 13/239; G06V 10/40; G06V 20/50; H04L 51/07

See application file for complete search history.

(56) References Cited

U.S. PATENT DOCUMENTS 11,169,832 B1 11/2021 Ngai et al.
11,468,734 B1 10/2022 Russ et al.

(Continued)

FOREIGN PATENT DOCUMENTS

KR 20200101235 A 8/2020
KR 20200139258 A 12/2020

(Continued)

OTHER PUBLICATIONS

International Search Report and Written Opinion for International Application No. PCT/US2022/040572, dated Nov. 25, 2022 (Nov. 25, 2022)—12 pages.

(Continued)

*Primary Examiner* — Lixi C Simpson

(74) *Attorney, Agent, or Firm* — CM Law PLLC; Stephen J. Weed

(57) ABSTRACT

Systems and methods are described for sending a snapshot message using an electronic eyewear device by a first user capturing an image, identifying a physical marker in the captured image, and determining that the physical marker in the captured image has been within a field of view of the electronic eyewear device for a predetermined amount of time. A 3D snapshot including an object is captured and, each time the identified object appears in a field of view of the electronic eyewear device, a representation of the object is sent for display to a second user as if the real object was sent. The representation of the object may include the snapshot image, the object extracted from the snapshot (Continued)

image, a stored representation of the object, augmented reality content representing the object, etc.

20 Claims, 20 Drawing Sheets

Related U.S. Application Data

(60) Provisional application No. 63/240,126, filed on Sep. 2, 2021.

(51) Int. Cl.

| | |
|---|---|
| ***G06V 20/50*** | (2022.01) |
| ***H04L 51/07*** | (2022.01) |
| ***H04N 23/611*** | (2023.01) |
| *H04N 13/239* | (2018.01) |

(56) References Cited

U.S. PATENT DOCUMENTS

| | | | | |
|---|---|---|---|---|
| 11,488,336 | B1 | 11/2022 | Baron et al. | |
| 12,363,419 | B2 * | 7/2025 | Jun | G02B 27/0176 |
| 2012/0195464 | A1 | 8/2012 | Ahn | |
| 2013/0307771 | A1 | 11/2013 | Parker et al. | |
| 2015/0130689 | A1 | 5/2015 | Sugden et al. | |
| 2015/0324645 | A1 | 11/2015 | Jang et al. | |
| 2018/0253900 | A1 | 9/2018 | Finding et al. | |
| 2018/0365884 | A1 * | 12/2018 | Skidmore | G06T 19/006 |
| 2019/0213781 | A1 | 7/2019 | Park et al. | |
| 2019/0342536 | A1 | 11/2019 | DeLuca | |
| 2020/0027427 | A1 | 1/2020 | Allen et al. | |
| 2020/0143238 | A1 * | 5/2020 | Ramnath | G06N 3/0464 |
| 2020/0159337 | A1 | 5/2020 | Kin et al. | |
| 2020/0260068 | A1 | 8/2020 | Ullman et al. | |
| 2020/0265614 | A1 | 8/2020 | Jung et al. | |
| 2020/0319472 | A1 | 10/2020 | Kondo et al. | |
| 2020/0368616 | A1 | 11/2020 | Delamont | |
| 2021/0191589 | A1 | 6/2021 | Langholz et al. | |
| 2021/0218885 | A1 | 7/2021 | Tham et al. | |
| 2021/0303258 | A1 | 9/2021 | Tanaka | |
| 2021/0342884 | A1 | 11/2021 | Macdougall et al. | |
| 2022/0076495 | A1 | 3/2022 | Schowengerdt et al. | |
| 2022/0192346 | A1 | 6/2022 | Mouizina et al. | |
| 2022/0245758 | A1 | 8/2022 | Nourai et al. | |
| 2022/0269398 | A1 | 8/2022 | Casella | |
| 2022/0368828 | A1 | 11/2022 | Tham et al. | |
| 2023/0014774 | A1 | 1/2023 | Shin et al. | |
| 2023/0054759 | A1 | 2/2023 | Robinson et al. | |
| 2023/0258756 | A1 | 8/2023 | Brown | |

FOREIGN PATENT DOCUMENTS

| | | | |
|---|---|---|---|
| KR | 20210091739 | A | 7/2021 |
| WO | 2021067090 | A1 | 4/2021 |

OTHER PUBLICATIONS

International Search Report and Written Opinion for International Application No. PCT/US2022/040634, dated Nov. 25, 2022 (Nov. 25, 2022)—12 pages.
International Search Report and Written Opinion for International Application No. PCT/US2022/040708, dated Nov. 30, 2022 (Nov. 30, 2022)—13 pages.
1st Korean Office Action for KR 10-2024-7010805 dated Apr. 3, 2026, 9 pages (English translation—4 pages).
1st Korean Office Action for KR 10-2024-7010806 dated Apr. 3, 2026, 9 pages (English summary—7 pages).

* cited by examiner

SNAPSHOT MESSAGES FOR INDICATING USER STATE

CROSS-REFERENCE TO RELATED APPLICATIONS

This application is a Continuation of U.S. application Ser. No. 17/890,439 filed on Aug. 18, 2022, which claims priority to U.S. Provisional Application Ser. No. 63/240,126 filed on Sep. 2, 2021, the contents of all of which are incorporated fully herein by reference.

TECHNICAL FIELD

Examples set forth in the present disclosure relate to systems and methods for providing messaging from portable electronic devices, including wearable electronic devices such as smart glasses. More particularly, but not by way of limitation, the present disclosure describes systems and methods to enable wearers of electronic eyewear devices to provide snapshot messages indicating the wearer's state or context.

BACKGROUND

Wearable electronic devices such as electronic eyewear devices may communicate with application programs running on mobile devices such as a user's mobile computing device and, in some cases, may communicate directly with a server. In either case, the electronic eyewear device may support direct device integration with communication application backend services as well as third-party application programming interfaces (APIs) such as text-to-speech, the SHAZAM PLAYER® app, object recognition, and the like. The wearer of the electronic eyewear devices may select display features through interaction with the electronic eyewear device.

BRIEF DESCRIPTION OF THE DRAWINGS

Features of the various implementations disclosed will be readily understood from the following detailed description, in which reference is made to the appended drawing FIGURES. A reference numeral is used with each element in the description and throughout the several views of the drawing. When a plurality of similar elements is present, a single reference numeral may be assigned to like elements, with an added lower-case letter referring to a specific element.

The various elements shown in the FIGURES are not drawn to scale unless otherwise indicated. The dimensions of the various elements may be enlarged or reduced in the interest of clarity. The several FIGURES depict one or more implementations and are presented by way of example only and should not be construed as limiting. Included in the drawing are the following FIGURES.

DETAILED DESCRIPTION

Figure 1A:
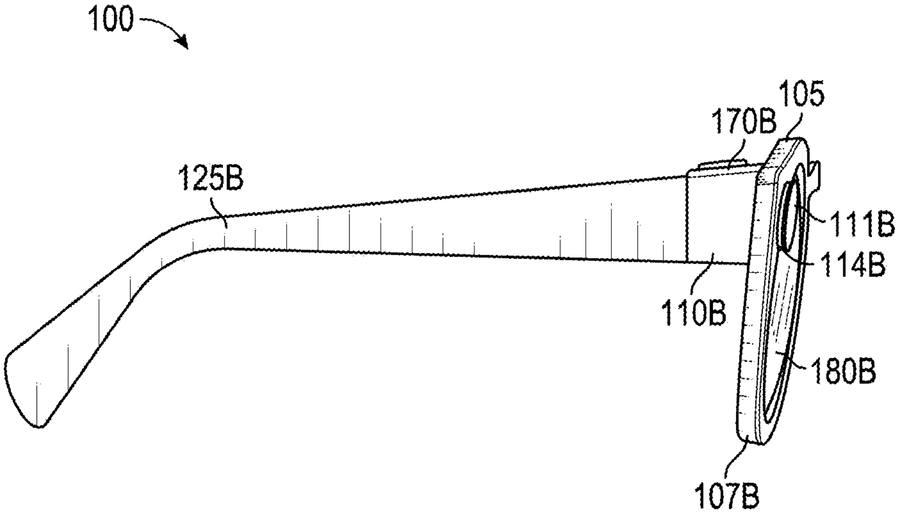
FIG. 1A illustrates a side view of an example hardware configuration of an electronic eyewear device showing a right optical assembly with an image display.

This disclosure is directed to systems and methods for sending a snapshot message using an electronic eyewear device by a first user capturing an image, identifying a physical marker in the captured image, and determining that the physical marker in the captured image has been within a field of view of the electronic eyewear device for a predetermined amount of time. A 2D or 3D snapshot including an object is captured and, each time the identified object appears in a field of view of the electronic eyewear device, a representation of the object is sent for display to a second user. The representation of the object may include the snapshot image, the object extracted from the snapshot image, a stored representation of the object, augmented reality content representing the object, etc. In a sample configuration, the snapshot is a 3D model of the real-world object that is so realistic that the receiver feels as if the sender has sent the object itself. In this example, the 3D model may blend seamlessly with the physical environment as if it were a real object.

Generally, a flexible, user-customizable platform is described for providing social connection between users of electronic eyewear devices. The systems and methods described herein enable wearers of electronic eyewear devices to indirectly interact with one another by establishing objects as personalized anchor points for social connection. The systems and methods enable a user to feel connected to another user by creating awareness of what a remote friend (who also has a compatible electronic eyewear device) is doing by creating distributed and connected "wormholes" using objects in the environments of the respective users. The remote friends may stay connected to each other by creating interpersonal awareness of what each friend is doing throughout the day using the "wormholes" between the connected objects. Various forms of configurable ambient awareness displays are integrated into the physical environment of wearers of the electronic eyewear devices to support interpersonal awareness and to foster social and emotional connections with other wearers of the electronic eyewear devices.

The systems and methods described herein thus enable social connection/presence through distributed and connected real-world objects. The connections may be symmetric (between like objects) or asymmetric (between different types of objects), and the content that is transferred may be abstract augmented reality (AR) content or real-world content. The systems and methods also support transient and persistent AR content. The transfer of such content via the distributed and connected real-world objects enables remote friends to indirectly interact with one another while wearing augmented reality (AR) smart glasses by establishing objects as personalized anchor points for social connection.

In sample configurations, users place physical markers on various objects that they use or come across in their daily lives. Using a companion mobile device application, the user may establish connections between their physical markers and their remote partner's set of physical markers. Once the connections are established, electronic eyewear devices worn by the respective users will detect a physical marker when it is in a field of view of view of their electronic eyewear device. Upon recognition of a physical marker, the electronic eyewear device triggers visual and auditory AR content to be projected to a second user based on the remote first user's activities and triggers the AR content to be placed at the second user's corresponding physical marker location (marker-endpoint). Alternatively, a setting may be changed to have AR content placed anywhere in the direct vicinity of the remote partner (user-endpoint). Thus, the system described herein has two system configurations. In the case of object-to-object, content is placed at the location of the corresponding marker. However, in the object-to-user mode, content is loaded at a location in the vicinity of the receiving partner.

The duration of time in which the marker-endpoint is in the field of view of the user's electronic eyewear device may determine what content is placed for the remote partner. A short period of time may trigger the placement of a simple abstract effect, such as a sparkle-like effect, at the remote partner's marker-endpoint or user-endpoint, whereas a longer predetermined period of time may trigger the electronic eyewear device to clone content from the wearer's real-world surroundings and to record audio for a short duration of time (i.e., 5 seconds). The cloned content and audio are then provided to the remote partner's marker-endpoint or user-endpoint.

The systems and methods described herein include at least the following main features that will become apparent from the following description:

Objects as triggers: The system enables each user to tag their own set of objects using physical markers. The user may flag specific objects as a proxy for activity detection by their electronic eyewear devices. Thereafter, when interacting with these tagged objects, the wearer's electronic eyewear devices are triggered to spawn AR or real-world content to be "placed" for their remote partner.

Objects or users as endpoints: The system also enables AR content to be "placed" in a remote partner's world using one of two strategies. The content is either placed by an object tagged with the corresponding physical marker (marker-endpoint), or the content is spawned in the vicinity of the remote partner (user-endpoint).

Real-world as a source for AR content: The system further includes a clone feature that enables visual content from the real-world to be captured and spawned for the remote partner to experience. Also, an audio capture feature may record ambient sounds or voices at the location of the marker-endpoint object, and the captured audio also may be played back to the partner. Thus, friends may see and hear highly personalized and authentic content pertaining to their remote friend's experiences.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device and associated system for providing social connections between users of electronic eyewear devices will be described with respect to FIGS. 1-16.

The system described herein includes three main hardware components: an electronic eyewear device, a mobile device, and a server. The electronic eyewear device will be described with respect to FIGS. 1-3, the mobile device will be described with respect to FIG. 5, and the server will be described with respect to FIG. 6. The corresponding system will be described with respect to FIG. 4. Operation of the software components, including application software on the electronic eyewear device and mobile device, as well as examples of system operation, will be described with respect to FIGS. 7-16. Such software components include system software for placing markers (e.g., marker-endpoints), mobile device software for establishing and managing the object connections, and electronic eyewear device software for recognizing the markers (e.g., objects in a scene) and for sending and receiving content. However, it will be appreciated that the mobile device and/or the server may be removed from the system provided the electronic eyewear device is adapted to include sufficient processing and storage capabilities to perform the described functions of the mobile device and/or the server.

Electronic Eyewear Device

In sample configurations, electronic eyewear devices with augmented reality (AR) capability are used in the systems described herein. Electronic eyewear devices are desirable to use in the system described herein as such devices are scalable, customizable to enable personalized experiences, enable effects to be applied anytime, anywhere, and ensure user privacy by enabling only the wearer to see the transmitted information. An electronic eyewear device such as SPECTACLES® available from Snap, Inc. of Santa Monica, California, may be used without any specialized hardware in a sample configuration.

Figure 2A:
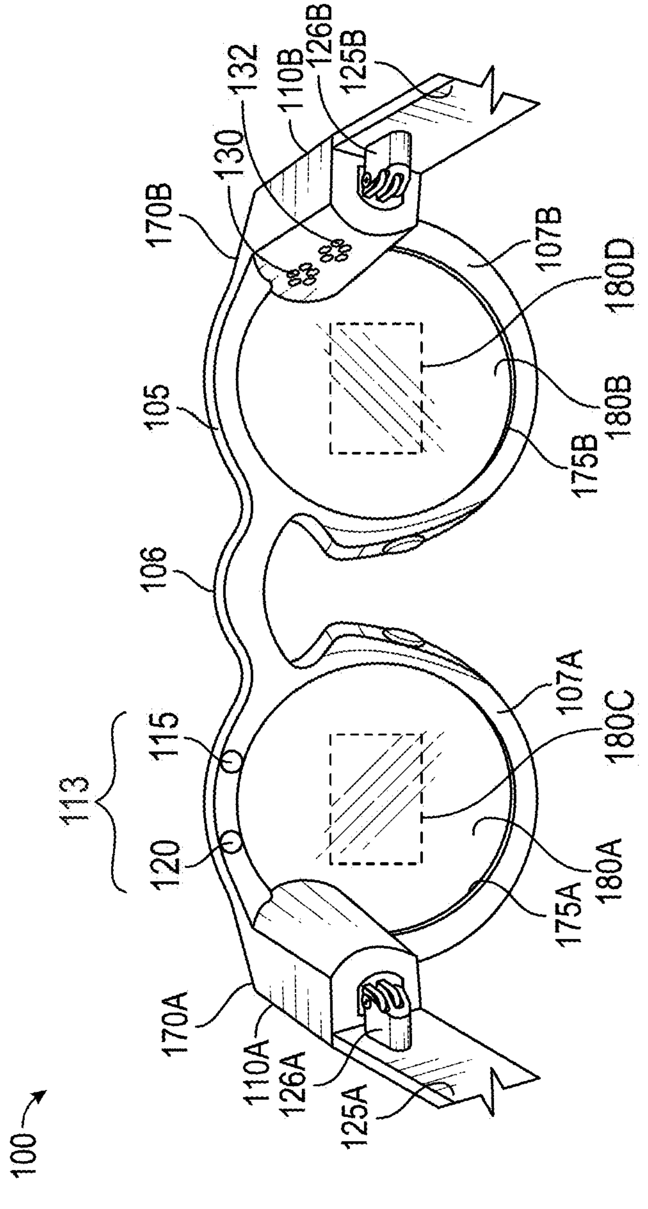
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 3) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 412 of FIG. 4) for digital processing along with a timestamp in which the image of the scene is captured. Image processor 412 may include circuitry to receive signals from the visible light camera 114A-B and to process those signals from the visible light cameras 114A-B into a format suitable for storage in the memory (element 434 of FIG. 4). The timestamp may be added by the image processor 412 or other processor that controls operation of the visible light cameras 114A-B. Visible light cameras 114A-B allow the stereo camera to simulate human binocular vision. Stereo cameras also provide the ability to reproduce three-dimensional images (image 315 of FIG. 3) based on two captured images (elements 358A-B of FIG. 3) from the visible light cameras 114A-B, respectively, having the same timestamp. Such three-dimensional images 315 allow for an immersive life-like experience, e.g., for virtual reality or video gaming. For stereoscopic vision, the pair of images 358A-B may be generated at a given moment in time—one image for each of the left and right visible light cameras 114A-B. When the pair of generated images 358A-B from the frontward facing field of view (FOV) 111A-B of the left and right visible light cameras 114A-B are stitched together (e.g., by the image processor 412), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 432 (FIG. 4) is coupled to the electronic eyewear device 100 and connected to the visible light cameras 114A-B and memory 434 (FIG. 4) accessible to the processor 432, and programming in the memory 434 may be provided in the electronic eyewear device 100 itself.

Figure 1B:
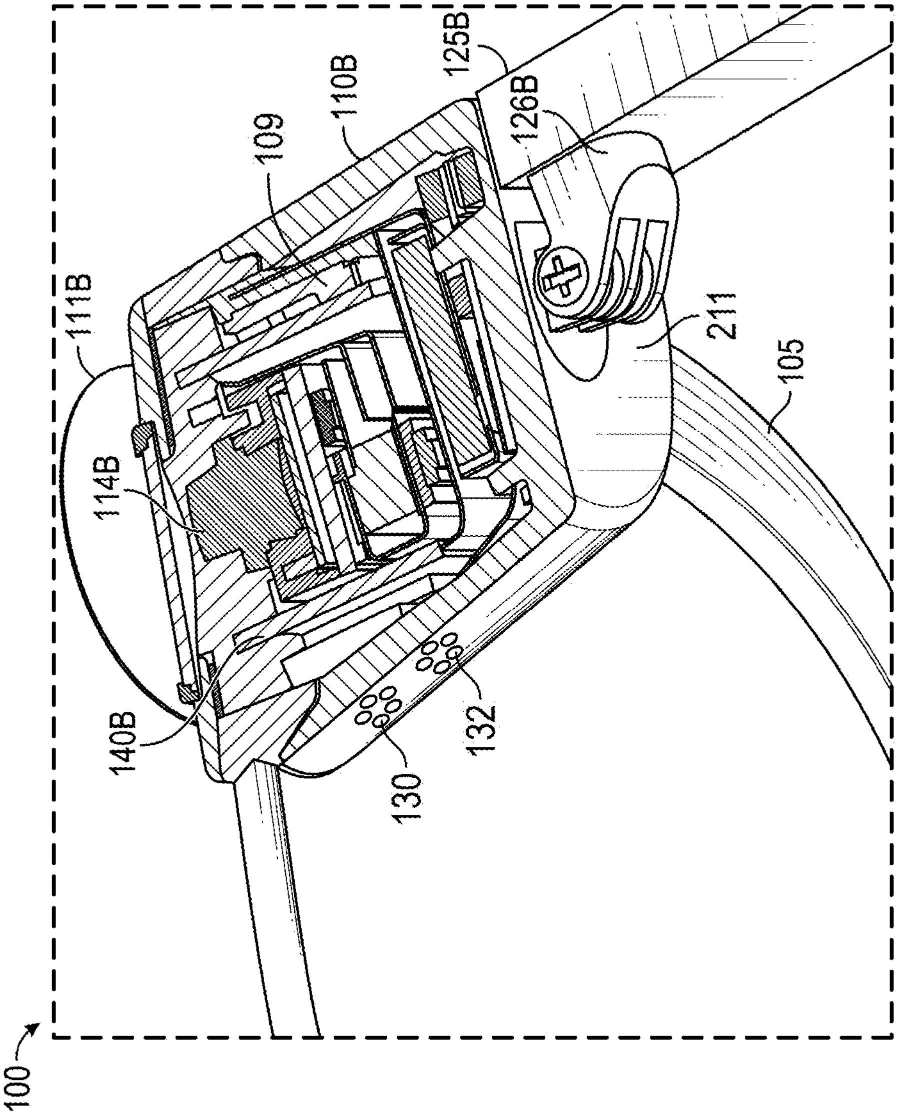
FIG. 1B illustrates a top cross-sectional view of a temple of the electronic eyewear device of FIG. 1A.
Figure 2B:
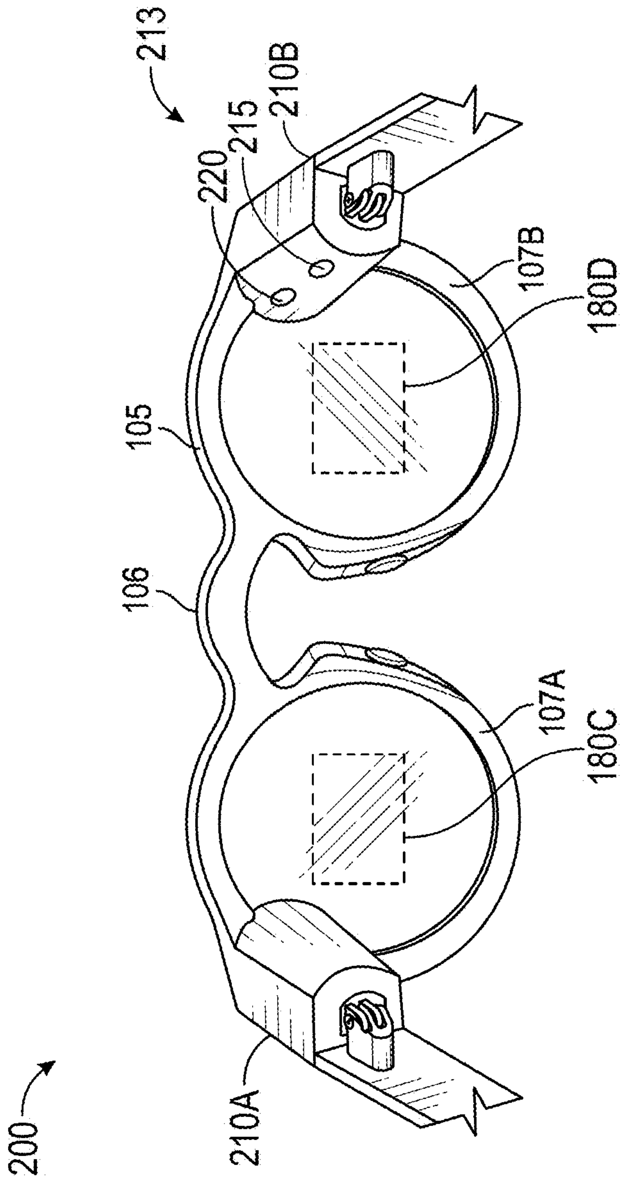
FIG. 2B illustrates a rear view of an example hardware configuration of another electronic eyewear device in an example hardware configuration.
Figure 2C:
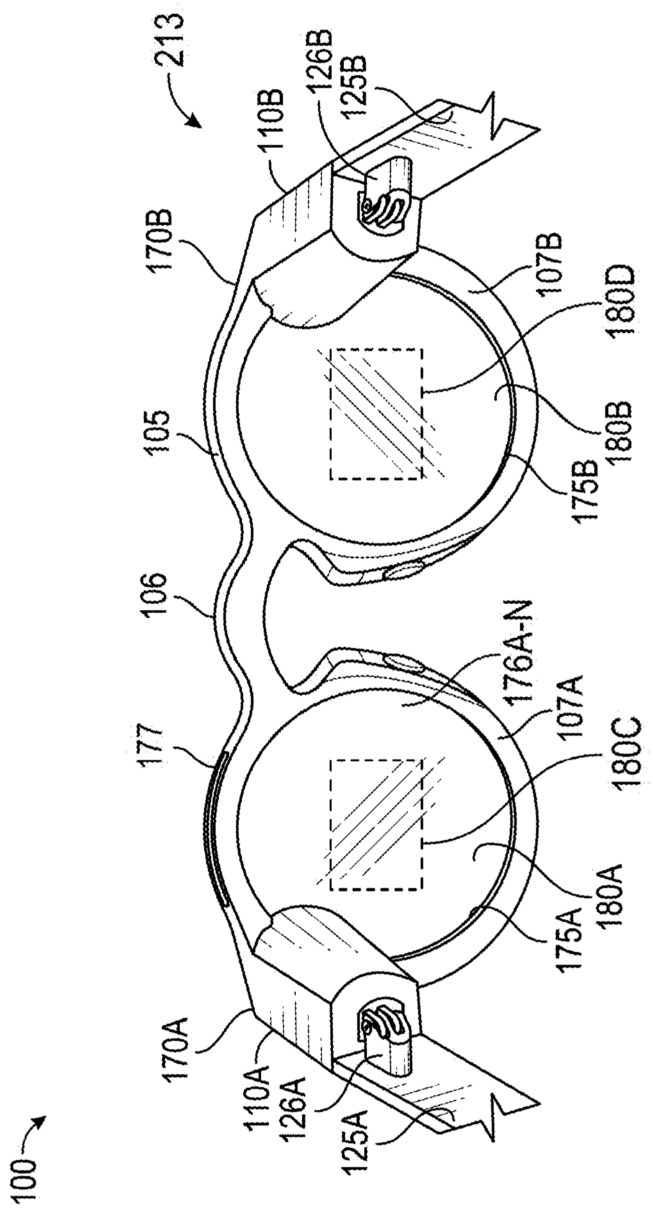
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 442 of FIG. 4) coupled to the see-through image displays 180C-D of optical assembly 180A-B to control the image displays 180C-D of optical assembly 180A-B to present the sequence of displayed images 315, which are described in further detail below. Electronic eyewear device 100 may further include the memory 434 and the processor 432 having access to the image display driver 442 and the memory 434, as well as programming in the memory 434. Execution of the programming by the processor 432 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 432 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the electronic eyewear device 100 to generate a successive displayed image of the sequence of displayed images based on the field of view adjustment. Execution of the programming by the processor 432 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means ±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outward facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
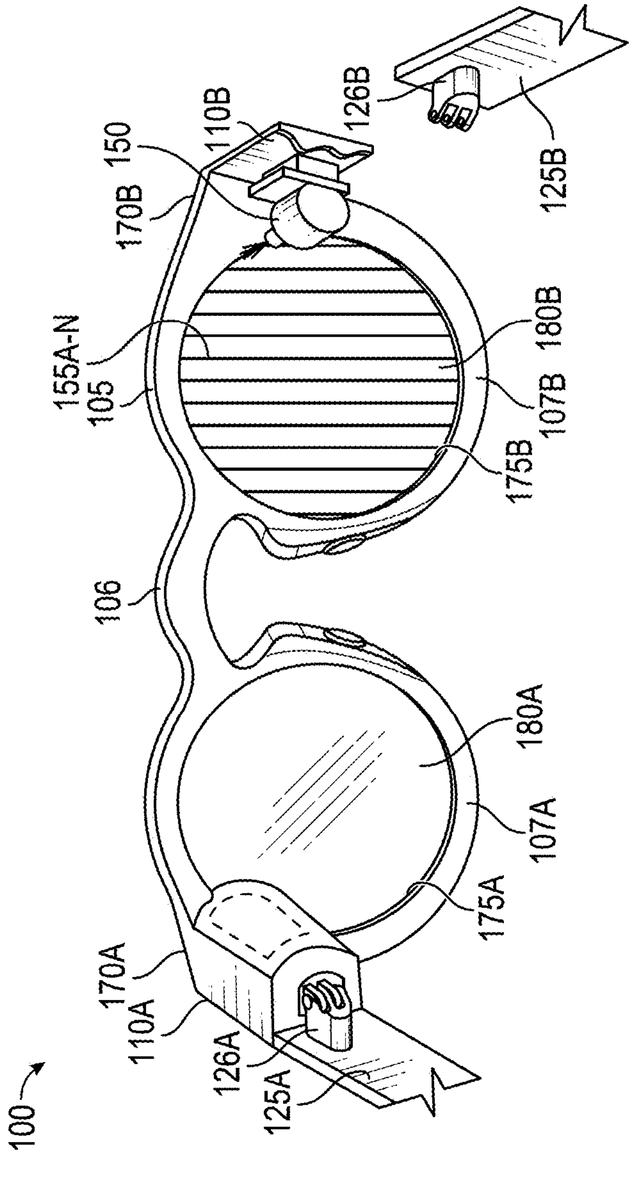

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180A-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix 177 of FIG. 2C or optical strips and a projector (not shown) in left temple 110A). The second optical assembly 180B may include the second see-through image display 180D (e.g., a display matrix of FIG. 2C or optical strips 155A-N and a projector 150 in right temple 110B). The successive field of view of the successive displayed image may include an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
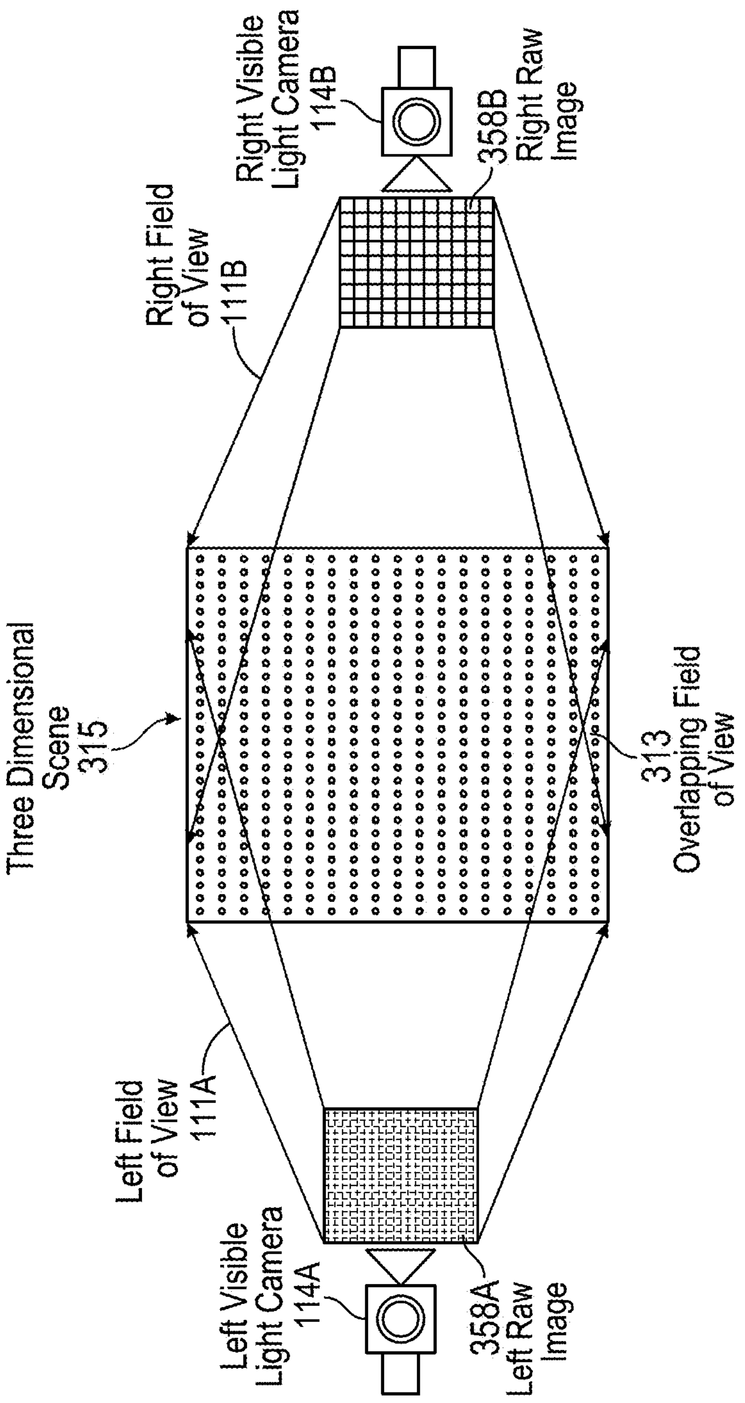
FIG. 3 illustrates an example of visible light captured by the left visible light camera as a left raw image and visible light captured by the right visible light camera as a right raw image.
Figure 4:
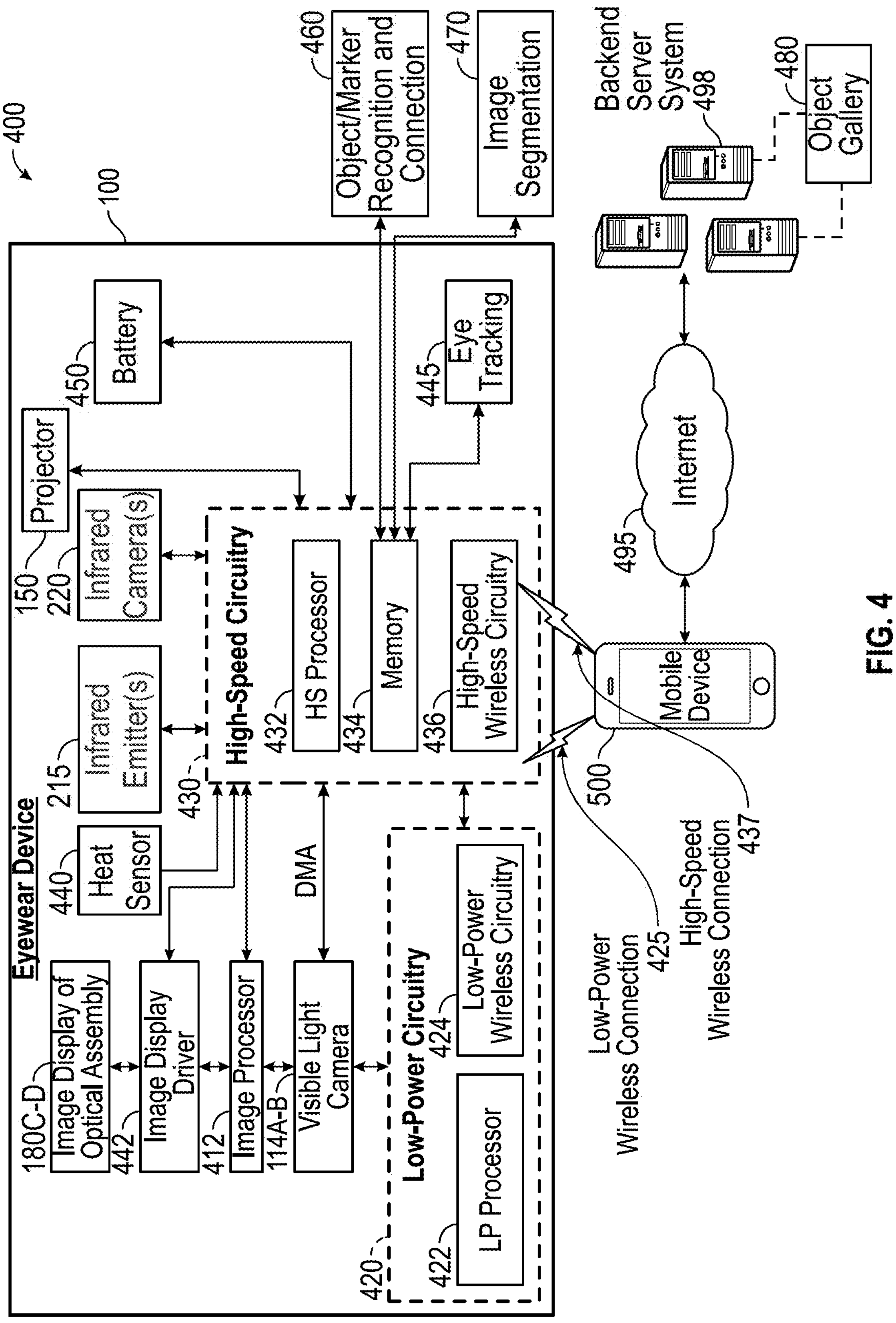
FIG. 4 illustrates a block diagram of electronic components of the electronic eyewear device in a system for providing social connections through objects in a sample configuration.

FIG. 3 illustrates an example of capturing visible light with cameras 114A-B. Visible light is captured by the left visible light camera 114A with a round field of view (FOV). 111A. A chosen rectangular left raw image 358A is used for image processing by image processor 412 (FIG. 4). Visible light is also captured by the right visible light camera 114B with a round FOV 111B. A rectangular right raw image 358B chosen by the image processor 412 is used for image processing by processor 412. Based on processing of the left raw image 358A and the right raw image 358B having an overlapping field of view 313, a three-dimensional image 315 of a three-dimensional scene, referred to hereafter as an immersive image, is generated by processor 412 and displayed by displays 180C and 180D and which is viewable by the user.

FIG. 4 illustrates a high-level functional block diagram including example electronic components disposed in electronic eyewear device 100 or 200. The illustrated electronic components include the processor 432, the memory 434, and the see-through image display 180C and 180D.

Memory 434 includes instructions for execution by processor 432 to implement the functionality of electronic eyewear devices 100 and 200, including instructions for processor 432 to control in the image 315. Such functionality may be implemented by processing instructions of eye tracking software 445, object/marker recognition and connection software 460, and image segmentation software 470 that is stored in memory 434 and executed by high-speed processor 432. Processor 432 receives power from battery 450 and executes the instructions stored in memory 434, or integrated with the processor 432 on-chip, to perform the functionality of electronic eyewear devices 100 and 200 and to communicate with external devices via wireless connections.

The electronic eyewear devices 100 and 200 may incorporate an eye movement tracker 445 (e.g., shown as infrared emitter 215 and infrared camera 220 in FIG. 2B) and may provide user interface adjustments via a mobile device 500 (FIG. 5) and a server system 498 connected via various networks. Mobile device 500 may be a smartphone, tablet, laptop computer, access point, or any other such device capable of connecting with the electronic eyewear devices 100 or 200 using both a low-power wireless connection 425 and a high-speed wireless connection 437. Mobile device 500 is further connected to server system 498 via a network 495. The network 495 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 442, image processor 412, low-power circuitry 420, and high-speed circuitry 430. The components shown in FIG. 4 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 445 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 442 to present the sequence of displayed images, including the initial displayed image with the initial field of view and the successive displayed image with the successive field of view.

The object/marker recognition and connection programming 460 and image segmentation programming 470 will be described in further detail below with respect to FIG. 16.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the left and right image displays 180C-D of the optical assembly 180A-B. High-speed processor 432 may be any processor capable of managing high-speed communications and operation of any general computing system needed for electronic eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the electronic eyewear device 100 or 200 and the operating system is stored in memory 434 for execution. In addition to any other responsibilities, the high-speed processor 432 executing a software architecture for the electronic eyewear device 100 or 200 is used to manage data transfers with high-speed wireless circuitry 436. In certain examples, high-speed wireless circuitry 436 is configured to implement Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the electronic eyewear devices 100 and 200 can include short range transceivers (BLUETOOTH®) and wireless wide, local, or wide area network transceivers (e.g., cellular or WI-FI®). Mobile device 500, including the transceivers communicating via the low-power wireless connection 425 and high-speed wireless connection 437, may be implemented using details of the architecture of the electronic eyewear device 100 and 200, as can other elements of network 495.

Memory 434 includes any storage device capable of storing various data and applications, including, among other things, color maps, camera data generated by the left and right visible light cameras 114A-B and the image processor 412, as well as images generated for display by the image display driver 442 on the see-through image displays 180C-D of the optical assembly 180A-B. While memory 434 is shown as integrated with high-speed circuitry 430, in other examples, memory 434 may be an independent standalone element of the electronic eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Server system 498 may be one or more computing devices as part of a service or network computing system, for example, which includes a processor, a memory, and network communication interface to communicate over the network 495 with the mobile device 500 and electronic eyewear devices 100 and 200. Electronic eyewear devices 100 and 200 may be connected with a host computer. For example, the electronic eyewear devices 100 or 200 may be paired with the mobile device 500 via the high-speed wireless connection 437 or connected to the server system 498 via the network 495. Also, as explained in more detail below, a gallery 480 of snapshots and AR objects may be maintained by the backend server system 498 for each user and invoked by communications providing links to the stored snapshots and AR objects.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 442. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 500, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensor 440, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 500 via the low-power wireless circuitry 424 or high-speed wireless circuitry 436.

Mobile Device

Figure 5:
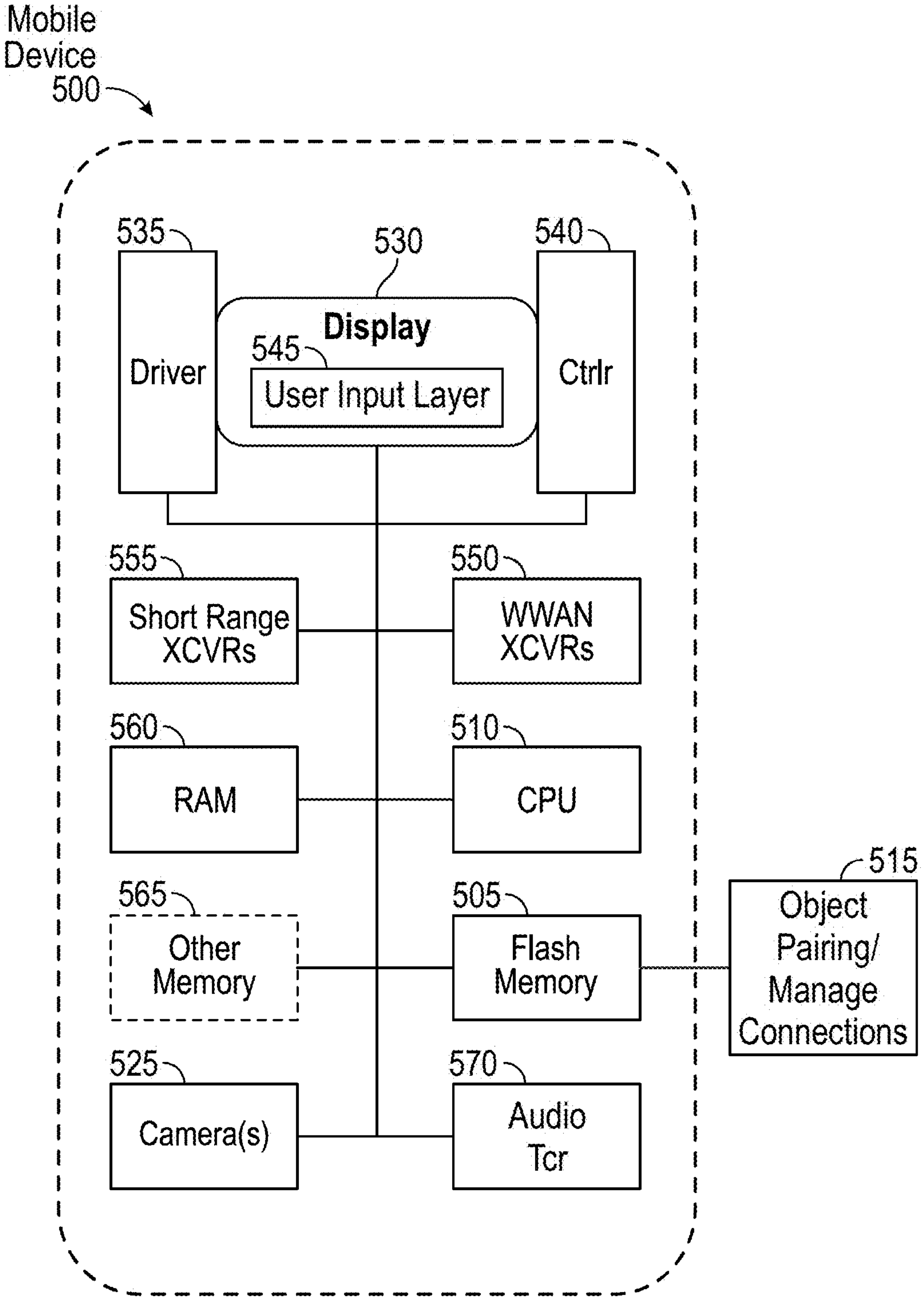
FIG. 5 illustrates a block diagram of electronic components of a mobile device adapted for use with system of FIG. 4.

FIG. 5 illustrates a sample configuration of a mobile device 500 adapted to manage social connections via objects in sample configurations. In particular, FIG. 5 is a high-level functional block diagram of an example mobile device 500 that a user may use to manage social connections via objects as described herein. Mobile device 500 may include a flash memory 505 that stores programming to be executed by the CPU 510 to perform all or a subset of the functions described herein. For example, the flash memory may store object pairing and connection management software 515 for execution by CPU 510 to enable the user of the mobile device 500 to establish objects as markers and to manage connections as described herein with respect to FIG. 15. The mobile device 500 may further include a camera 525 that comprises one or more visible-light cameras (first and second visible-light cameras with overlapping fields of view) or at least one visible-light camera and a depth sensor with substantially overlapping fields of view. Flash memory 505 may further include multiple images or video, which are generated via the camera 525.

The mobile device 500 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 500 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 500 includes at least one digital transceiver (XCVR) 550, shown as WWAN XCVRs, for digital wireless communications via a wide-area wireless mobile communication network. The mobile device 500 also may include additional digital or analog transceivers, such as short-range transceivers (XCVRs) 555 for short-range network communication, such as via NFC, VLC, DECT, ZigBee, Bluetooth™, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 500, the mobile device 500 also may include a global positioning system (GPS) receiver. Alternatively, or additionally, the mobile device 500 may utilize either or both the short range XCVRs 555 and WWAN XCVRs 550 for generating location coordinates for positioning. For example, cellular network, WI-FI®, or Bluetooth™ based positioning systems may generate very accurate location coordinates, particularly when used in combination. Such location coordinates may be transmitted to the mobile device 500 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 500.

The mobile device 500 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smartphone, laptop computer, and tablet.

The CPU 510 serves as a programmable host controller for the mobile device 500 by configuring the mobile device 500 to perform various operations, for example, in accordance with instructions or programming executable by CPU 510. For example, such operations may include various general operations of the mobile device 500, as well as operations related to the programming for messaging apps and AR camera applications on the mobile device 500. Although a processor may be configured by use of hardwired logic, typical processors in mobile devices are general processing circuits configured by execution of programming.

The mobile device 500 further includes a memory or storage system, for storing programming and data. In the example shown in FIG. 5, the memory system may include flash memory 505, a random-access memory (RAM) 560, and other memory components 565, as needed. The RAM 560 may serve as short-term storage for instructions and data being handled by the CPU 510, e.g., as a working data processing memory. The flash memory 505 typically provides longer-term storage.

Hence, in the example of mobile device 500, the flash memory 505 may be used to store programming or instructions for execution by the CPU 510. Depending on the type of device, the mobile device 500 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 500 may include an audio transceiver 570 that may receive audio signals from the environment via a microphone (not shown) and provide audio output via a speaker (not shown). Audio signals may be coupled with video signals and other messages by a messaging application or social media application implemented on the mobile device 500.

Backend Server System

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Figure 6:
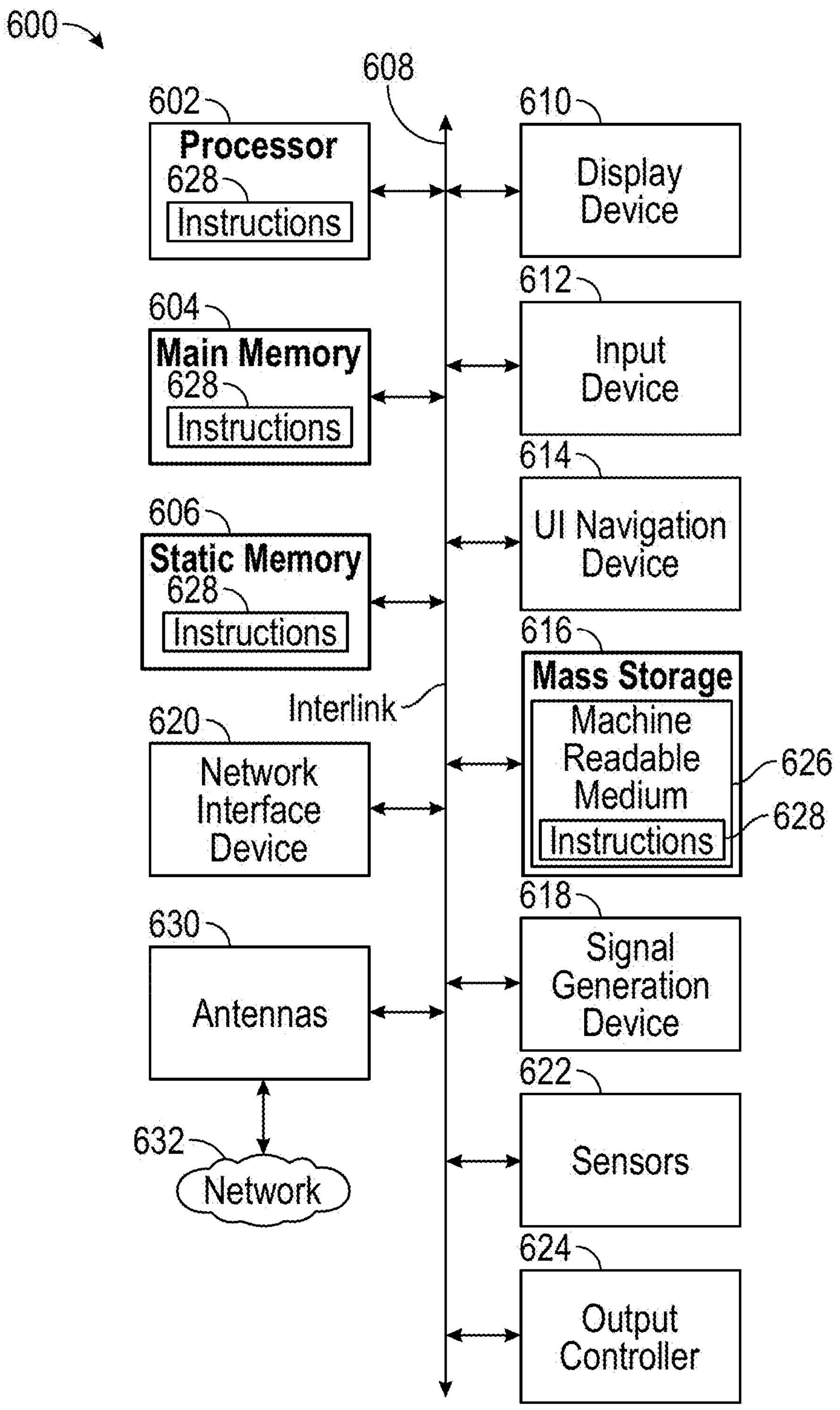
FIG. 6 illustrates a sample configuration of a computer system adapted to implement the server of the system of FIG. 4 in a sample configuration.
Figure 7:
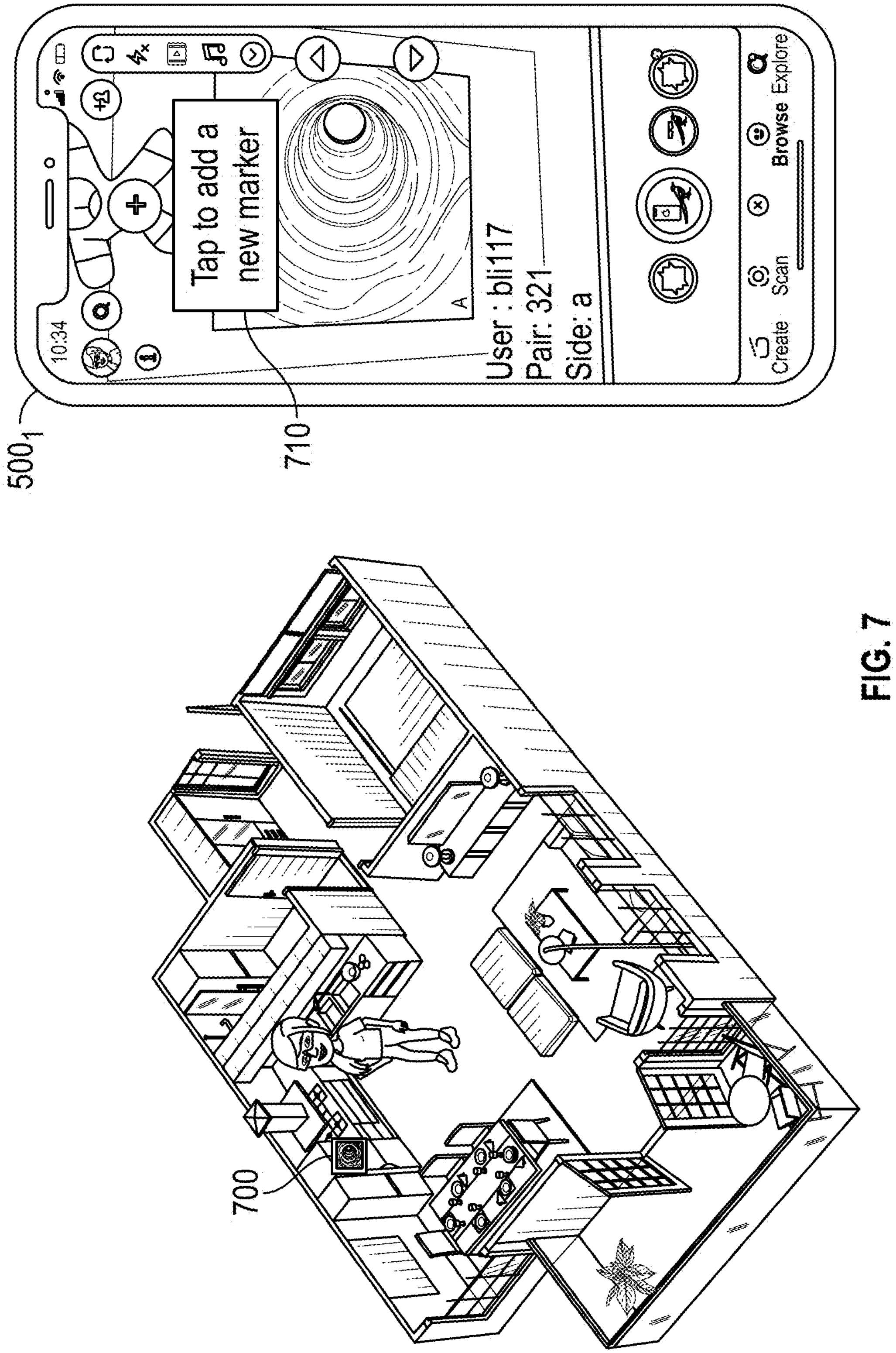
FIG. 7 illustrates establishing a first object as a marker for a first user for establishing a social connection in a sample configuration.

FIG. 6 illustrates a sample configuration of a computer system adapted to implement the systems and methods described herein. In particular, FIG. 6 illustrates a block diagram of an example of a machine 600 upon which one or more configurations of the backend server system 498 (FIG. 4) may be implemented. As described herein, the backend server system 498 may execute instructions for connecting the IDs, images, and descriptions of respective marker-endpoint objects or user-endpoint objects and for storing communications of AR generated objects (e.g., sparkles) and/or user-generated objects (e.g., snapshot of coffee mug) received from a first user for transmission to a second user upon receipt of an indication that the second user is a user-endpoint or has viewed the user's corresponding marker-endpoint with the user's electronic eyewear device. The backend server system 498 may also maintain a gallery 480 of user snapshots and AR objects. In alternative configurations, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. In sample configurations, the machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as a workstation, a front-end server, or a back-end server of a communication system. Machine 600 may implement the methods described herein by running the software used to implement the features for controlling IoT devices as described herein. Further, while only a single machine 600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 also may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine readable media.

While the machine readable medium 626 is illustrated as a single medium, the term "machine readable medium" may include a single medium or multiple media (e.g., at least one of a centralized or distributed database, or associated caches and servers) configured to store the one or more instructions 628. The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 628 may further be transmitted or received over communications network 632 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 632. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Distributed and Connected Real-World Objects

To implement the functionality for providing social connections between objects as described herein, two software applications are implemented on the hardware described above. One application runs on the mobile device 500 (iPhone/Android) and one runs on the electronic eyewear device 100. Both partners in a pair use both applications to implement the functionality.

In a sample configuration, the mobile device application 515 (FIG. 15) is installed on a mobile device 500 by each user by, for example, scanning a Snap Code available from Snap, Inc. of Santa Monica, California. Each user logs into the mobile device application 515 with their login information. Once the user is signed in and has identified their metadata (i.e., a Pair ID and a user assignment, User A or User B), the user can place markers and take photos of their locations to be stored in the mobile device application. Once a pair of corresponding markers has been set up by each user, respectively, a connection is established between them through which AR exchanges can occur. The respective users' electronic eyewear devices 100 are paired to the respective mobile device applications to leverage this connection information.

On the other hand, the electronic eyewear device application 460 (FIG. 16) is installed on the user's electronic eyewear device 100 and allows each user to experience (see, listen) to content from the remote friend. An electronic eyewear device 100 including the electronic eyewear device application 460 will be able to detect the user's physical markers and will load auditory and visual content from the remote partner for the user to experience. In the examples described herein, two forms of visual AR content may be sent: 1) AR content denoting user presence, such as floating sparkles, and 2) cloned visual content, selected snapshots or AR content with or without a recorded audio snippet which is extracted from the real-world environment.

The system so configured enables remote friends to indirectly interact with one another while wearing augmented reality (AR) electronic eyewear devices 100 by establishing objects as personalized anchor points for social connection. The system allows friends to be aware of each other's state—what they are doing as they interact and use different objects throughout the day—by leaving traces, whether indoors or outdoors. The users place physical markers on various objects that they use or come across in their daily lives. The physical markers are a proxy to actual object detection and may be generated dynamically. Using the companion mobile device application 515, the user may establish connections between their physical markers and their remote partner's set of physical markers. The users may set symmetric connections (such as from lamp-to-lamp) or asymmetric connections (such as from lamp-to-mug). Once set, an electronic eyewear device 100 running the electronic eyewear device application 460 may detect the physical marker when the physical marker is in the field of view of the electronic eyewear device 100, thereby triggering AR content to be projected for the user (visual and auditory content), based on the remote partner's activities and AR content to be placed at the remote partner's corresponding marker location (marker-endpoint).

In sample configurations, the duration of time in which the marker is in the wearer's field of view determines what content is placed for the remote partner. A time-buffer is used to track the duration of time in which the marker is in the field of view. A short period of time triggers the placement of predetermined AR content, such as an abstract sparkle-like effect, at the remote partner's marker-endpoint, while a longer period of time triggers the electronic eyewear device to clone content from the wearer's real-world surroundings or to select prestored AR content, as well as to record audio for a short duration of time (i.e., 5 seconds). The system also may support transient and persistent AR. Depending on the setting, the AR content on the receiver side can accumulate and build up (persistent) or fade away after viewing (transient). As time passes, the AR content's color and/or brightness may fade away as well to indicate how long ago an activity was performed by the user.

The systems and methods described herein thus allow users to interact with and share their state with friends by just looking at objects having pre-set physical markers around them. The physical markers may be fixed objects in the user's surroundings but may also be faces, pets, vehicles, and the other movable objects such as a person. The systems and methods provide passive, hands-free messaging by simply looking at (scanning) a particular object or marker to indicate their state. Using the system, a user can send messages from one object to another, or from an object to the user directly, anywhere the user may be located. Once a series of objects with marker-endpoints are set up, a user can simply walk in their home or outdoors, go through their routine, and just by looking at the marker-endpoints, their friends will be notified about their activities and actions. In sample configurations, looking at a marker-endpoint object triggers and sends a default AR content (e.g., sparkles) to the receiver at a specific location or anywhere to which the marker-endpoint object has been connected. Conversely, while looking at a marker-endpoint object, the system can recommend relevant AR content, for utilitarian or expressive purposes, that the user may use to send to their friend. For example, a user of the electronic eyewear device 100 may scan a scene and recommend AR content including, for example, a set of AR Lenses of the type available from Snap, Inc. of Santa Monica, California, that the user can select and send to a friend.

In the case where a face is used as a marker, messages may be triggered when the user looks at the face. For example, if a user selects Suni Lee's face as a marker, every time the user watches her perform, the user's friend is notified. The friend would thus be informed that the user is watching gymnastics right now. Similarly, if a user selects their friend's face, any time they see their friend, a message will be triggered indicating that they both are together.

The systems and methods described herein further allow users to create 3D snapshots of real-world objects to indicate their state and place (realistic) AR content as if the actual object was at their friend's location. This can also lead to the creation of a gallery, public or private, and serve as a marketplace. In this case, the system enables a user to create a clone of a real-world object and share it with their friend to indicate their state or context—as if that object was in their friend's space. For example, the user may provide a passive snapshot. If the user selects a mug as a marker, then every time the user looks at or scans the mug, a snapshot is created and sent to the connected friend as a realistic AR mug. Each snapshot can indicate the type and the level of coffee remaining in the mug by synchronizing the state between the real mug and an AR mug. On the other hand, in the case of an active snapshot, a user may scan an object such as a flower while taking a walk and place the flower at a friend's desk, remotely in AR, to indicate that the user is taking a walk. Similarly, the user may send a snapshot of a new dress to indicate that she is shopping.

Just like picture, gif and video galleries available today, users may create a gallery 480 (FIG. 4) of 3D snapshots, private or public, that users can use to indicate their state or mood. This approach can create a significant repository of realistic AR content that is invoked by providing links in communications to enable access by users via their electronic eyewear devices 100 and a marketplace for objects that can be bought/rented/leased. In addition to individual users, businesses can create snapshots of the food or artifacts that a user can access via a map. In this case, users may scan AR objects that show up on the map where the objects were scanned. Restaurants can scan the food before it is sent and people can see the food that is to be delivered to them. Users may scan all different pieces of a place to create a virtual place on the map that represents the real-life one. In a sample configuration, the snapshot is a 3D model of the real-world object that is so realistic that the receiver feels as if the sender has sent the object itself. In this example, the 3D model may blend seamlessly with the physical environment as if it were a real object.

In other applications, users may place something from their world into their friend's world, keep a copy of that object forever, give multiple copies of the object to different people, modify or augment the digital object, put that digital object into their own augmented reality (AR)/virtual reality (VR) world, use the object as a building block for a bigger object, and/or simulate presence by discussing an object as if that object was right between two different users.

Operation of the systems and methods will become apparent from the following illustrative operational examples.

It is assumed that a pair of close friends (user 1 and user 2) who live a significant distance from each other would like to stay socially connected to each other using their electronic eyewear devices 100. To do so, user 1 establishes a local object as a marker-endpoint. To do so, user 1 identifies an object 700 (e.g., refrigerator) in her apartment (FIG. 7) by selecting an image of the object 700 as a marker-endpoint at 710. The mobile device application 515 of user 1's mobile device $\mathbf{500}_1$ then provides an object identifier and a picture of the selected object 700 to the backend server system 498. The object identifier may include a name provided by user 1. User 1 then uses the mobile device application 515 to connect the identified object 700 to an object similarly identified by user 2. The IDs, pictures, and provided names for the objects marked by the respective users are stored in an application of the backend server system 498 as part of a social media communications platform connecting user 1 and user 2. As noted above, the object markers are a proxy to actual object detection and may be generated dynamically. A plurality of such connections may be established between user 1 and user 2. The connections may be symmetric (such as from refrigerator-to-refrigerator) or asymmetric (such as from lamp-to-mug) and may be 1-1, 1-N, N-1, or N-N connections, where N is an integer.

Figure 8:
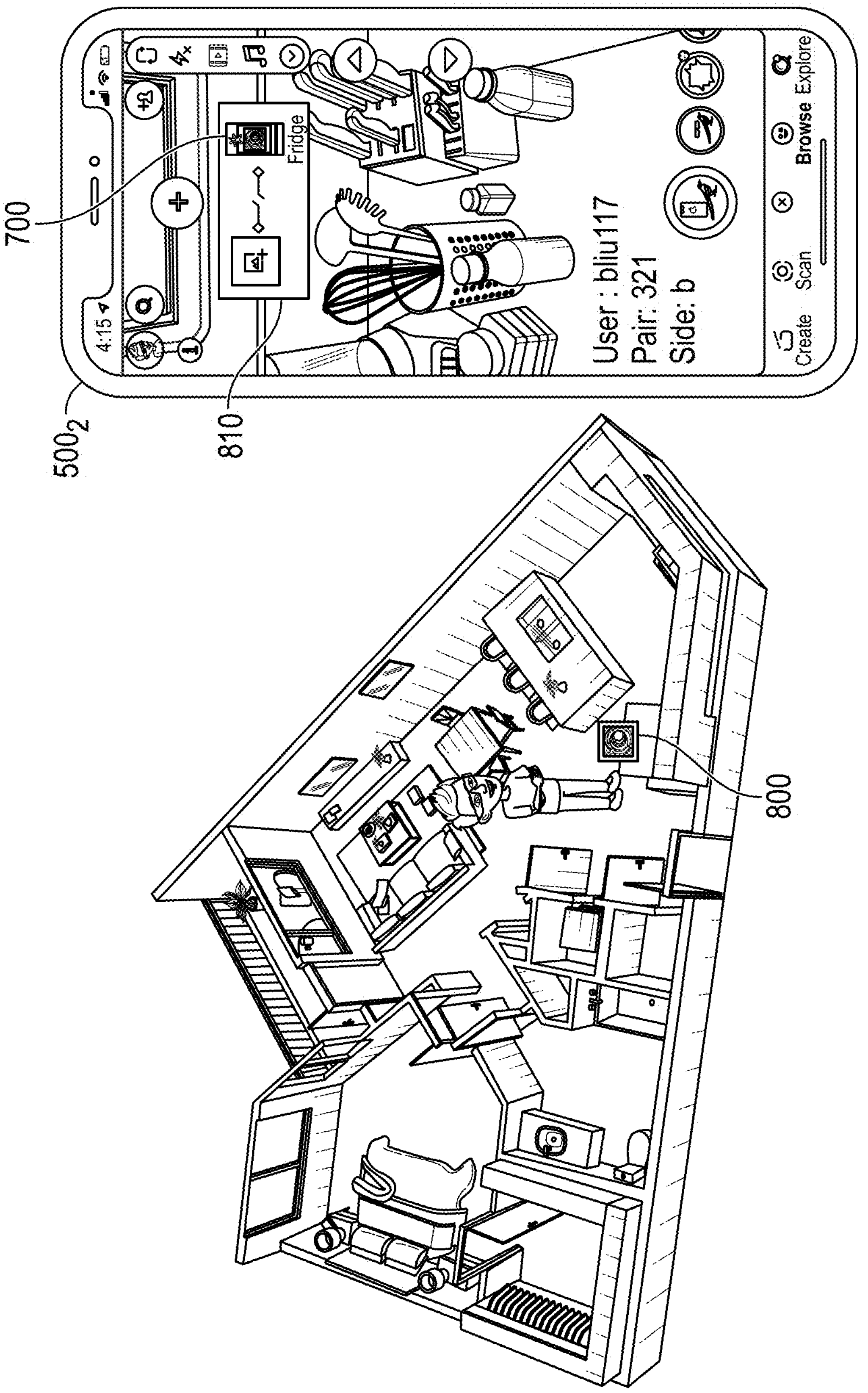
FIG. 8 illustrates completion of a social connection by establishing a second object as a marker for a second user in a sample configuration.

As illustrated in FIG. 8, user 2 similarly identifies an object 800 (e.g., a cabinet) in his apartment by selecting an image of the object 800 as a marker and connecting the object 800 to one or more of user 1's objects (e.g., refrigerator 700) using a mobile device application of user 2's mobile device 500$_2$ at 810. Providing a name such as "refrigerator" may facilitate such connections.

Figure 9:
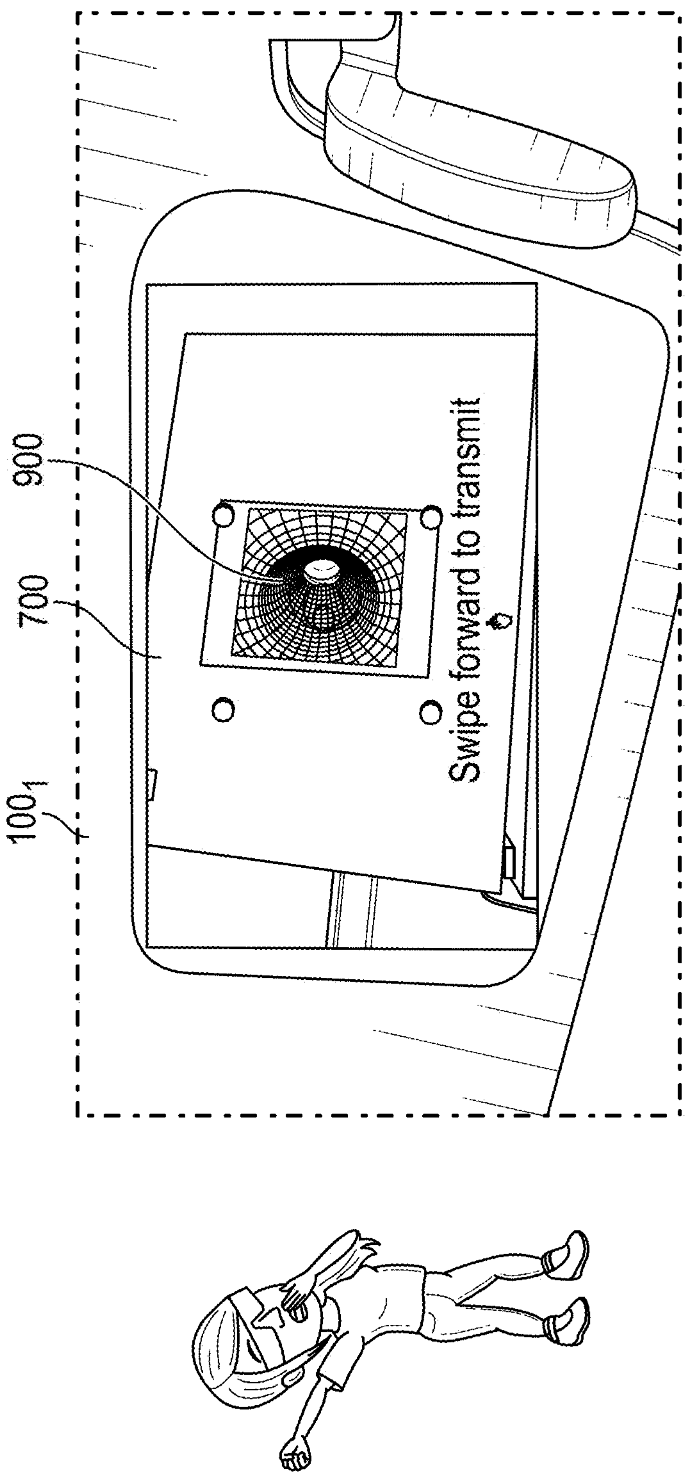
FIG. 9 illustrates the transmission of sparkles from the first user to the second user by the first user simply glancing at the first object established as a marker.

Now that a connection has been made between user 1's refrigerator 700 and user 2's cabinet 800, the system is ready to implement the social connectivity functionality. To activate the social connectivity features, user 1 simply glances at her refrigerator 700 while wearing her electronic eyewear device 100$_1$. As shown in FIG. 9, the electronic eyewear device 100$_1$ scans user 1's surroundings and identifies the refrigerator 700 using object recognition capabilities of the electronic eyewear device 100$_1$. To scan the user's surroundings for marker-endpoint objects or to identify objects to establish as marker-endpoint objects, the user's electronic eyewear device 100 may monitor the user's gaze direction and linear or rotational movement of the user's head to track the scene. A visual scan by the electronic eyewear device 100 can be activated with scan initiation means such as a button tap or a press and hold of a scan button at any time. In the case of a visual scan, the captured image may be forwarded to a trained neural network of a deep learning model on the electronic eyewear device 100 or to backend services available on the backend server system 498 accessible to the electronic eyewear device 100 to process the captured image to identify objects in the scene. A voice scan, on the other hand, may be initiated by a "wake word," which is a phrase that wakes the electronic eyewear device 100 from sleep to trigger a scan by the camera 150 or to trigger a search for objects by voice-to-text processing of the user's voice to extract keywords that are matched to objects in the scene. In either case, "signal descriptor text" may be presented to a display of the electronic eyewear device 100 as objects in the captured scene or words in the captured voice are recognized. The objects having a recognition score above a set confidence score may be identified as potential marker objects to be provided to the display of the electronic eyewear device 100 in response to the scan. Scan notifications such as sounds or displayed words or icons may be used to indicate when a background scan has been initiated. When the background scan has been completed, a notification of the completed scan results may be provided to the display.

Upon recognizing the refrigerator 700 in the scanned image, the electronic eyewear device 100$_1$ initiates a transmission of a simple communication to user 2 indicating that user 1 is active and has viewed the refrigerator 700. For example, the electronic eyewear device 100$_1$ may initiate the transmission of a communication that includes a link to invoke a preselected AR image or animation such as sparkles from user 1 to user 2 by simply glancing at the refrigerator 700 established as the marker-endpoint between user 1 and user 2. The electronic eyewear device 100$_1$ may optionally present to user 1's display a representation of a wormhole 900 that is activated when the refrigerator 700 is viewed by user 1 and presents an animation showing the sparkles being sucked into the wormhole 900 for transmission via the wormhole 900 to user 2. The animation may also include corresponding sound effects. Optionally, user 1's interaction with refrigerator 700 may be timestamped and the timestamp information provided with the communication (e.g., with the sparkles).

Figure 10:
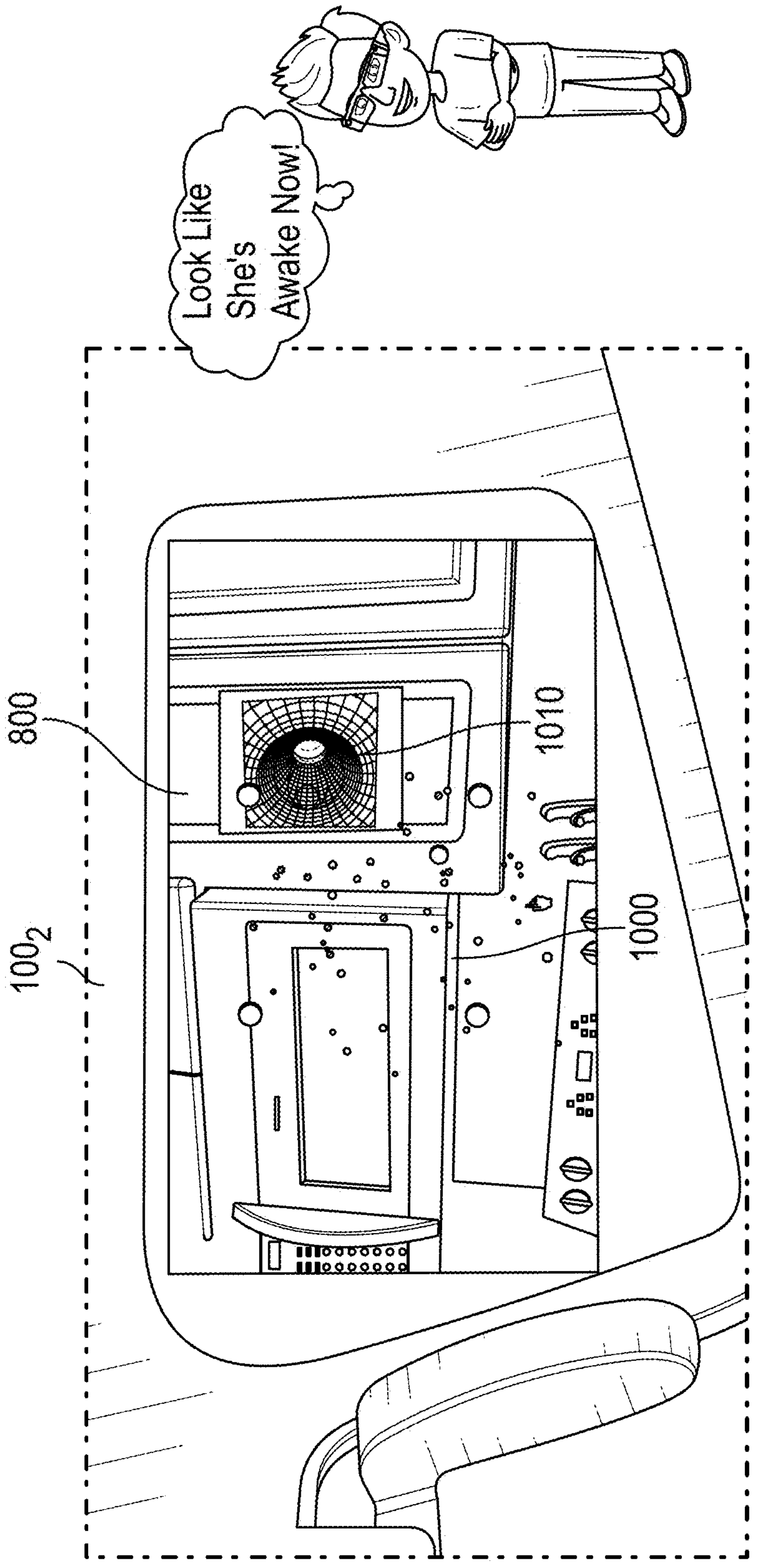
FIG. 10 illustrates the reception of sparkles by the second user upon the second user glancing at the second object established as a marker.

To receive the communication (sparkles) from user 1, user 2 simply puts on his electronic eyewear device 100$_2$ and glances at his marker-endpoint object 800 (e.g., cabinet) connected to user 1's object 700 (e.g., refrigerator). Upon user 2's electronic eyewear device 100$_2$ recognition of the object 800, any communication associated with object 800 is pushed from the backend server system 498 to user 2's electronic eyewear device 100$_2$. As shown in FIG. 10, upon recognition of the object 800, the sparkles 1000 invoked by the communication from user 1 are received and displayed as an overlay on the display of user 2's electronic eyewear device 100$_2$. The electronic eyewear device 100$_2$ may optionally present to user 2's display a representation of a wormhole 1010 that is activated and presents an animation showing the sparkles being shot out of the wormhole 1010 to the display of user 2's electronic eyewear device 100$_2$. The animation may also include corresponding sound effects. Such presentation of the sparkles 1000 indicates to user 2 that user 1 is awake and active and has glanced at her refrigerator 700.

As another example, it is assumed that user 2 would like to respond to user 1 by sending a communication showing what he is doing and that he is thinking of user 1. User 2 decides to show user 1 that he is drinking coffee from a mug that user 1 gave to user 2 as a gift. As noted above, the duration of time in which user 2's marker (e.g., cabinet 800) is in user 2's field of view may determine what content is placed for user 1. A short period of time may trigger the placement of a simple abstract effect, such as the sparkle effect received from user 1. However, a recognition by user 2's electronic eyewear device 100$_2$ that user 2 has been viewing the cabinet 800 for a longer predetermined period of time may trigger user 2's electronic eyewear device 100$_2$ to clone content from user 2's real-world surroundings. In this case, user 2 may elect to capture a snapshot of mug 1100 that user 1 gave to user 2 as a gift. The mug 1100 may be extracted from the captured snapshot using image segmentation software 470 of user 2's electronic eyewear device 100$_2$. Alternatively, the segmented image may be processed by image processing software of the backend server system 498 to provide a 2D or a 3D rendering of the segmented image. User 2's electronic eyewear device 100$_2$ may also present user 2 with the option of recording audio for a short duration of time (i.e., 5 seconds) to send with the segmented image of mug 1100.

Figure 11:
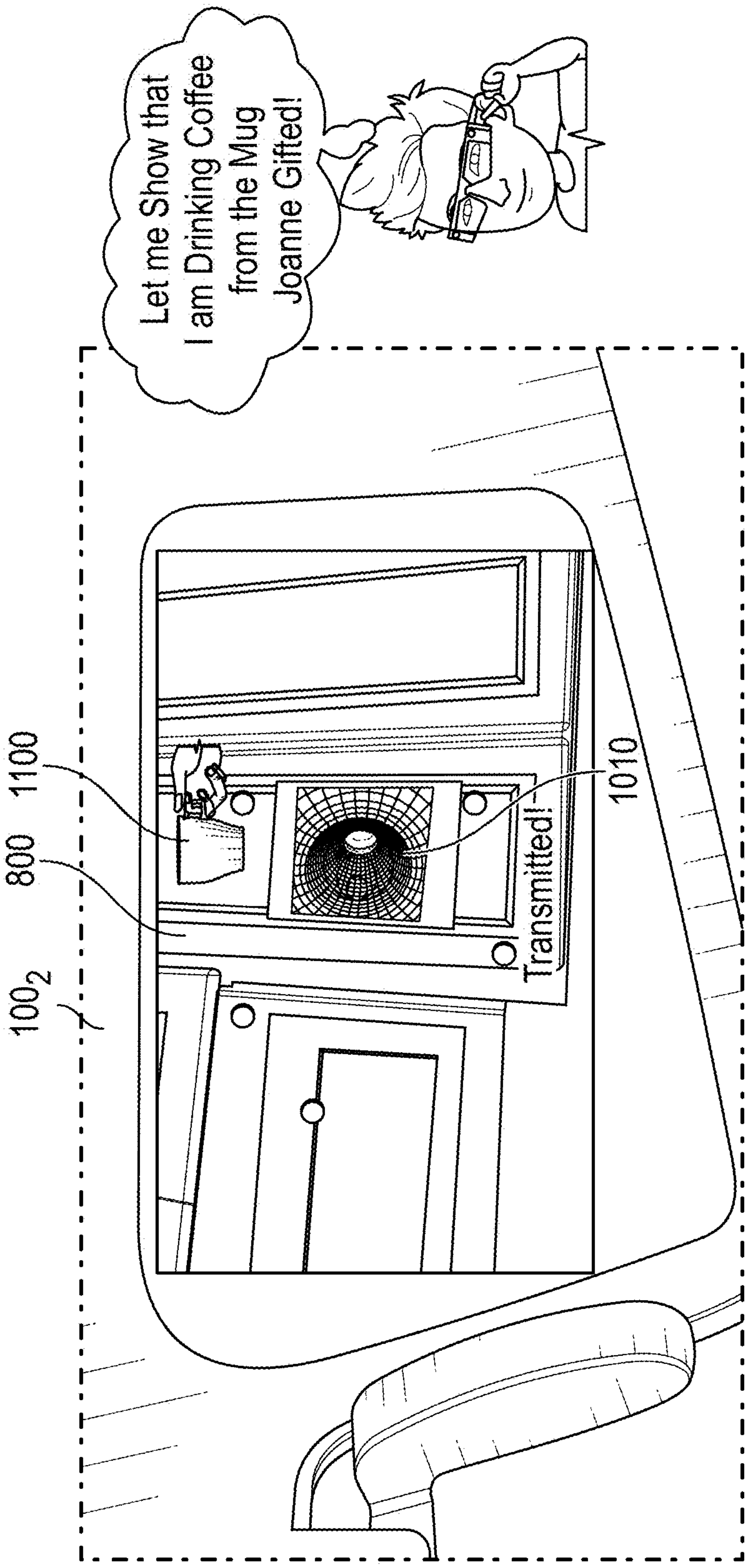
FIG. 11 illustrates the transmission of an object segmented from the surroundings (a mug) for transmission by the second user to the first user via the connection between the first and second objects.

Once the segmented mug image 1100 and the audio recording are captured, user 2 may swipe forward or provide a recognized gesture to transmit a ghost image of the mug 1100 with the audio recording to user 1. As shown in FIG. 11, the electronic eyewear device 100$_2$ may optionally present to the display of user 2's electronic eyewear device 100$_2$ a representation of the ghost image of the mug 1100 in front of wormhole 1010. User 2's electronic eyewear device 100$_2$ may also present an animation showing the wormhole 1010 being activated and sucking a ghost image of the mug 1100 into the wormhole 1010, along with associated sound effects.

Figure 12:
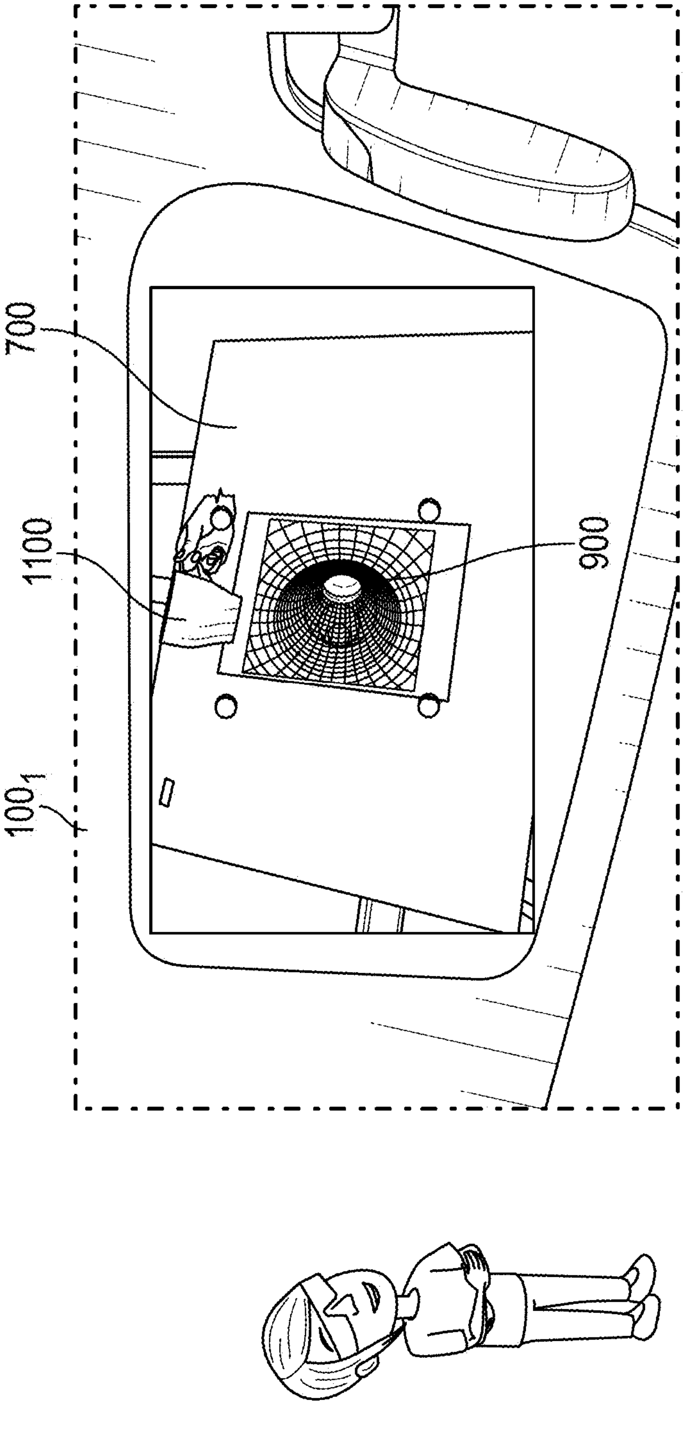
FIG. 12 illustrates receipt of the object (mug) transmitted to the first user by the second user via the connection between the first and second objects.

To receive the communication including the image of mug 1100 from user 2, user 1 simply glances at her marker-endpoint object 700 (e.g., refrigerator) connected to user 2's object 800 (e.g., cabinet). Upon user 1's electronic eyewear device 100$_1$ recognition of the object 700, any communication associated with object 700 is pushed from the backend server system 498 to user 1's electronic eyewear device $100_1$. As shown in FIG. 12, upon recognition of the object 700, the snapshot of mug 1100 from user 2 is received and displayed as an overlay on the display of user 1's electronic eyewear device $100_1$. The electronic eyewear device $100_1$ may optionally present to user 1's display a representation of a wormhole 900 that is activated and presents an animation showing the image of the mug 1100 appearing out of the wormhole 900 to the display of user 1's electronic eyewear device $100_1$, along with optional sound effects associated with the presentation of the image. Such presentation of the image of the mug 1100 along with the playback of the audio recording from user 2 indicates to user 1 that user 2 is drinking coffee from a mug that user 1 gave to user 2 as a gift. Thus, user 1 may appreciate that user 2 thought of user 1 during user 2's coffee break.

Figure 13:
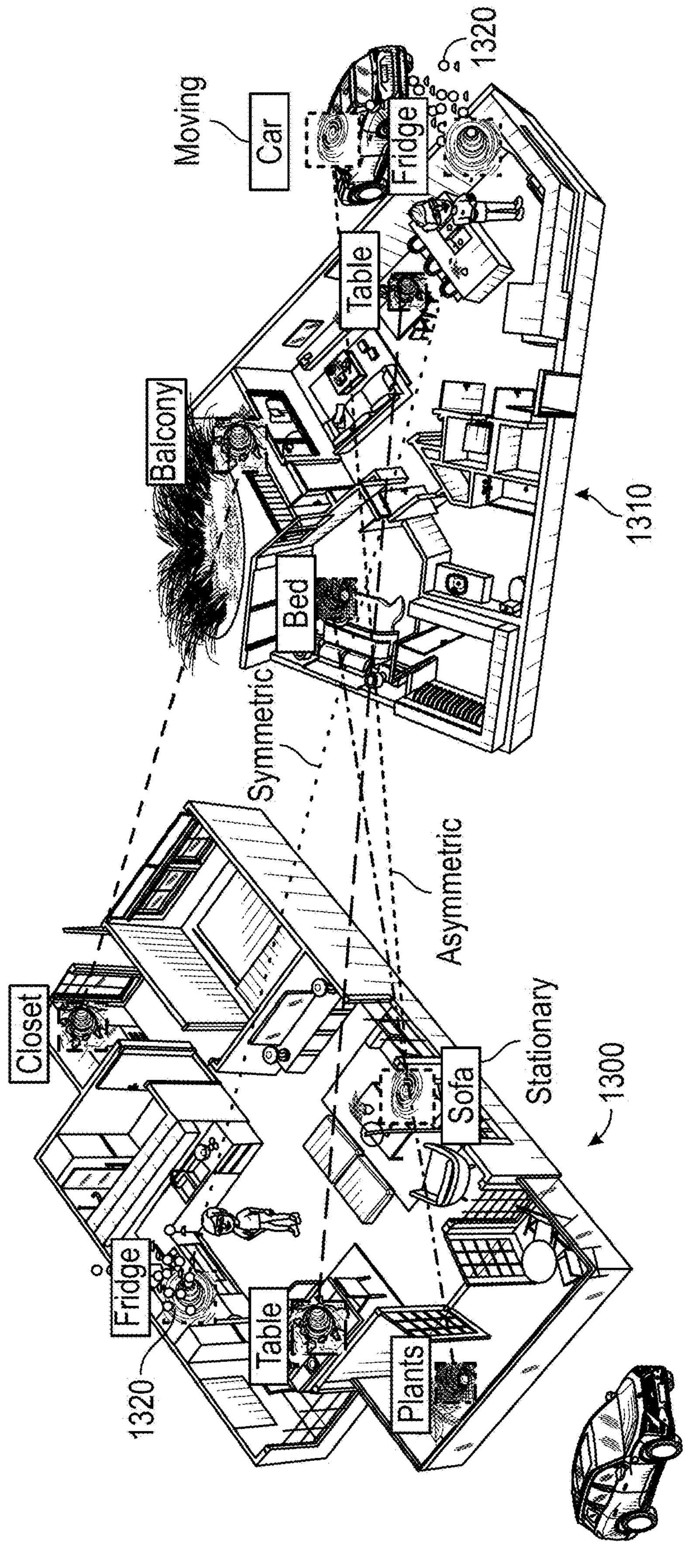
FIG. 13 illustrates sample connections of objects for socially connecting the first and second users by sending sparkles to indicate that the respective users are present, in a sample configuration.
Figure 14:
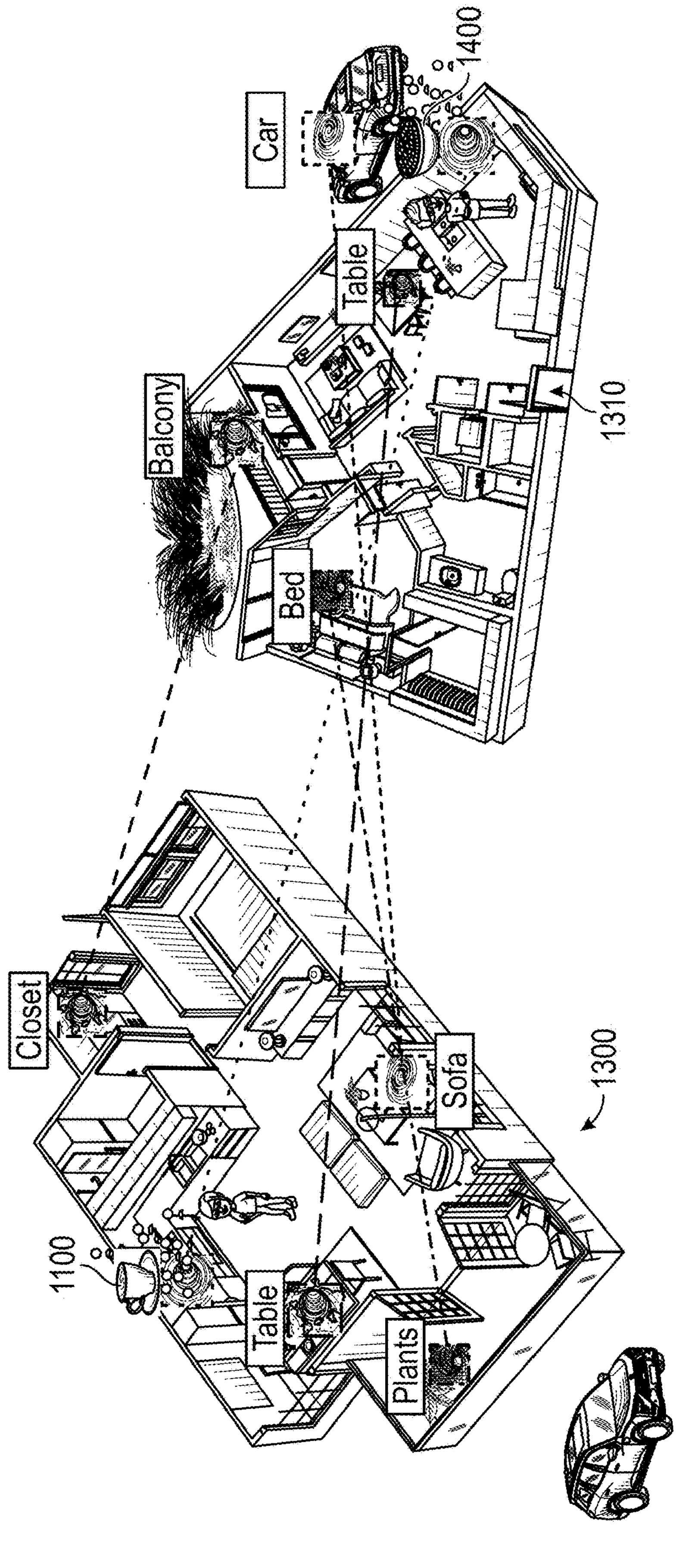
FIG. 14 illustrates sample connections of objects for socially connecting the first and second users by sending objects between the users, in a sample configuration.

As illustrated in FIGS. 13 and 14, the connections of marker-endpoint objects between user 1's apartment 1300 and user 2's apartment 1310 for socially connecting user 1 and user 2 may be symmetric (between like objects) or asymmetric (between different types of objects) and may be between stationary and moving objects. Also, as noted above, the connections may be 1-1, 1-N, N-1, and N-N, so any combination of marker-endpoint objects may be used to connect the environments 1300 and 1310 of user 1 and user 2. The connected objects may provide a social graph connecting respective objects within the respective surroundings of the respective users. Of course, the users have to make more effort to keep track of the respective ends of the wormholes when asymmetric connections are used.

In FIG. 13, sparkles 1320 are sent from user 1 to user 2 (and vice-versa) to indicate that the respective users are present. Similarly, in FIG. 14, the snapshot of mug 1100 and the snapshot of cereal bowl 1400 are sent between user 1 and user 2 as indicated to further the social connectedness of user 1 and user 2 by indicating that what each is doing at the time the transmission was sent. Of course, the snapshots or segmented images could be any object, including an image of another friend or group of friends.

Figure 15:
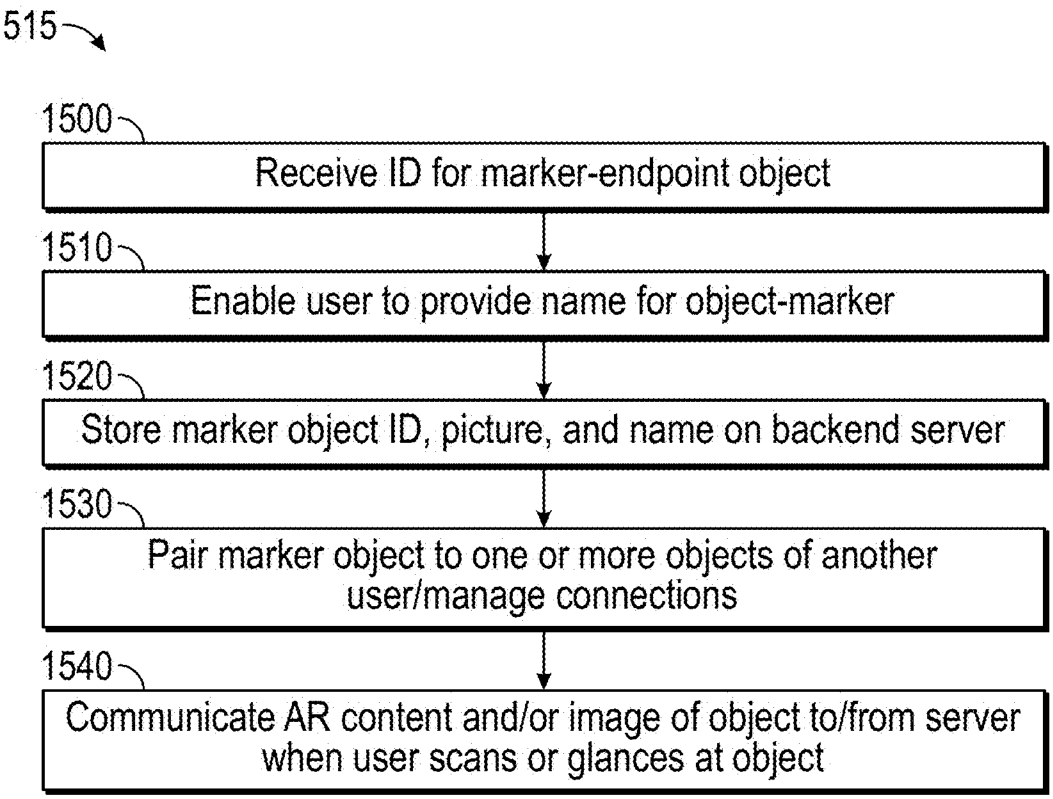
FIG. 15 illustrates a flow chart implemented by the mobile device for providing object pairing and managing connections in a sample configuration.

FIG. 15 illustrates a flow chart for functionality implemented by the mobile device 500 associated with the electronic eyewear device 100 to provide object pairing and to manage connections in a sample configuration. Such functionality may be implemented as object pairing/connection management software 515 in FIG. 5.

As indicated in FIG. 15, the mobile device 500 receives an identification tag (ID) at 1500 for a marker-endpoint object selected by the user of the associated electronic eyewear device 100. The user is presented with the option at 1510 to provide a name for the identified marker object. For example, if the marker object is the user's refrigerator, the user may name the marker "refrigerator." Such naming facilitates pairing by another user. In certain configurations, it may be desirable to name another user as the marker object, in which case, any AR objects or images of real-world objects would proceed directly to the mobile device 500 and/or the electronic mobile device of the other user. In this latter case, the other user would be a user-endpoint object.

At 1520, the marker object ID, its picture, and its name are stored on the backend server system 498 to facilitate pairing with other users. At 1530, the user may access the marker objects of another user for pairing with the identified marker object. In this case, the other user's marker objects with their pictures, names, and IDs are presented to the display of the user's mobile device 500 for selection. The selected marker objects of the other user are paired with the user's marker object and the connection is stored in the backend server system 498. The other user's marker object may also include the user herself. In this case, the ID would be the user ID and the image would be an image of the user. The user endpoint would be the IP address of the user's mobile device 500 or electronic eyewear device 100. The user may also manage her connections by updating the marker objects of the other user that are connected to marker objects in the surroundings of the user. Once the connections have been so established, the AR content stored in the gallery 480 of the backend server system 498 and/or a snapshot of the object provided by the electronic eyewear device 100 may be invoked by communications to/from the backend server system 498 and the other user's electronic eyewear device $100_2$ at 1540 when the respective users scan or glance at their respective marker objects that are the respective marker-endpoint objects of the connection(s) between the users.

Figure 16:
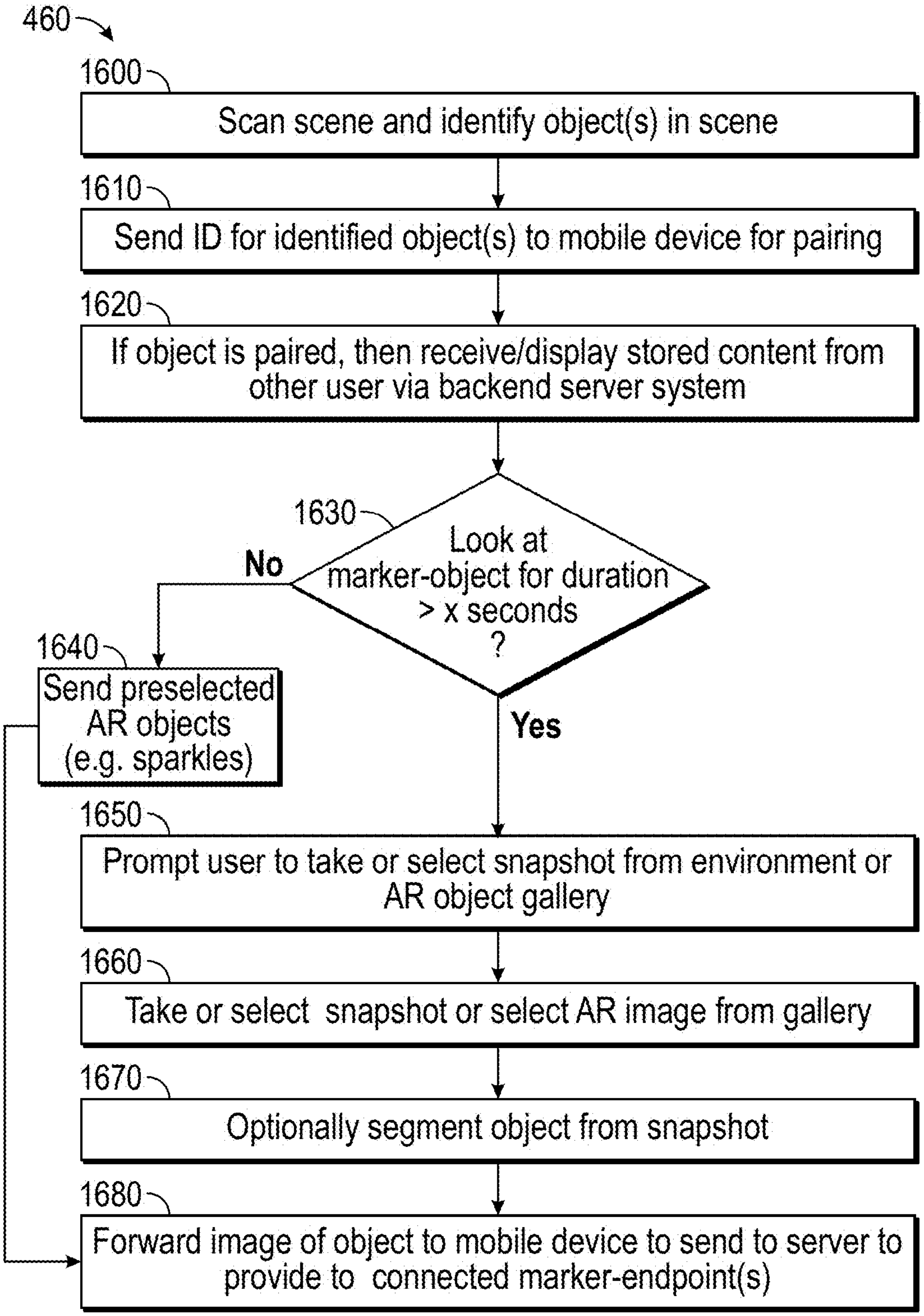
FIG. 16 illustrates a flow chart implemented by the electronic eyewear device for identifying and recognizing marker-endpoint objects and prompting the sending of at least one of AR objects or images from the environment for socially connecting respective users in a sample configuration.

FIG. 16 illustrates a flow chart for functionality implemented by the electronic eyewear device 100 to identify and recognize marker objects and to prompt the sending of AR objects and/or real-world images from the environment for socially connecting respective users in a sample configuration. Such functionality may be implemented as object/marker recognition and connection software 460 in FIG. 4.

As illustrated in FIG. 16, the electronic eyewear device 100 is initiated at 1600 by initiating a voice scan or a visual scan as described above. The scanned scene may be forwarded to a trained neural network of a deep learning model on the electronic eyewear device 100 or to backend services available on the backend server system 498 accessible to the electronic eyewear device 100 to process the captured image to identify objects in the scene. An ID for the identified object(s) is provided for tracking purposes, and the ID and picture of the object may be provided to the associated mobile device 500 for pairing (see FIG. 15) at 1610. However, such pairing is not necessary as the message may be sent using any conventional communication device, such as SMS text or email.

If the identified object is already paired, then the electronic eyewear device 100 may receive and display at 1620 any content that has been provided by another user having an object paired to the identified object. This content may be stored at the backend server system 498 and invoked by a communication to the user's electronic eyewear device 100 upon detection of the paired object in the scanned image. As noted above, depending on the setting, the AR content may accumulate and build up (persistent data) or fade away after viewing (transient data). Over time, the AR content's color may fade away to indicate how long ago an activity was performed by the user. The time of the activity may also be recorded, and the AR content may be stored in a message gallery 480, as desired.

In sample configurations, the electronic eyewear device 100 further keeps track of how long the user looks at the paired marker-object in order to determine what type of message should be sent to a paired user. If it is determined at 1630 that the user has only glanced at the paired object for no more than a predetermined short duration (e.g., x seconds, where x is 1-5), then a preselected AR object such as sparkles is invoked by a communication sent to the paired user at 1640. On the other hand, if it is determined at 1630 that the user has looked at the paired object for at least the predetermined short duration, then the user may be prompted at 1650 to take a snapshot (active snapshot) or to select a prestored snapshot (passive snapshot) from the environment or to select a prestored AR object from an AR object gallery 480 to send to the paired user. At 1660, the user option is captured. If the user selected to send a snapshot, image segmentation software 470 (FIG. 4) optionally may be activated at 1670 to segment an object from the active or passive snapshot to send to the paired user, or the snapshot may be sent without modification. On the other hand, if the user has selected a prestored AR object from the AR object gallery 480, then the selected AR object is invoked by a communication sent to the user. For example, rather than sending an extracted snapshot of a mug in the above example, a prestored snapshot of the mug or a 3D representation of the mug that was prestored in the AR object gallery 480 may be invoked by the communication instead (e.g., by a link to the storage location in the AR object gallery 480 of the prestored snapshot of the mug or 3D representation of the mug). At 1680, the selected snapshot or AR object or segmented object from the real-world scene is invoked by a communication sent to the mobile device 500 over the network 495 to the backend server system 498. The backend server system 498, in turn, provides the invoked image to the electronic eyewear device 100 of the other user for viewing adjacent the paired marker object(s) when the other user views the paired marker object(s). When the paired marker object is the other user, the image may be provided directly to the electronic eyewear device 100 of the other user for display in the vicinity of the other user. Alternatively, the electronic eyewear device 100 may communicate directly with the backend server system 498, provided the electronic eyewear device 100 has the requisite circuitry to communicate directly over an Internet connection. However, the communication may be picked up by the second user by conventional means without pairing, such as directly via their electronic eyewear device 100 or their mobile device 500.

Users may share information with each other in many different scenarios using the system and methods described herein. For example, user 1 may establish a marker-endpoint object as her mirror and send images of what clothing she has elected to wear for the day. User 2 may place a marker-endpoint object near his piano and send sparkles and an audio clip each time he sits down to play his piano. The users may also share images of their meals while they eat.

It will be further appreciated that the backend server system 498 may maintain a gallery 480 of AR content and images that users have exchanged with each other via particular connections much in the same way that SMS messaging systems maintain a record of texts sent back and forth between users or messaging systems such as SNAPCHAT® available from Snap, Inc. of Santa Monica, California, maintain communications in a Memories feature. The stored AR content and images may be presented to the display of the user's electronic eyewear device 100 for selection, as desired, in the event that the user wishes to resend a previously sent image. In particular configurations, the AR content may be Lenses of the type available from Snap, Inc. of Santa Monica, California.

Separately, it will be further appreciated that companies may provide logos on their products that may be used as respective marker-endpoint objects to establish communications "wormholes" with the logos of other users or the support personnel for the product. Such communications networks may be used to facilitate social connectedness through scanned based messaging amongst users of a product.

In another alternative configuration, rather than simply gazing at a marker-endpoint object, the electronic eyewear device 100 may track the global positioning system (GPS) coordinates of an object during respective scans in a session. Then, when the object is moved between scans in a session, the communication of AR elements (e.g., sparkles) or scanned objects may be triggered. Similarly, the endpoint object may be the paired user's mobile device, whereby the AR object or segmented image is provided to the paired user's paired electronic eyewear device 100 irrespective of the paired user's location.

In yet another alternative configuration, the marker-endpoint objects may be connected to endpoints in a map to provide a snapshot of 2D or 3D images from one or more users to a portion of a map that is being viewed by another user. For example, an image of a cheesesteak may be presented to the viewer's electronic eyewear device 100 when the viewer views Philadelphia on a map.

It will be appreciated by those skilled in the art that the methods described herein may be initiated and conducted without any particular gestures or touch operations. The actions may be activated from passive processing of the images in the scene to trigger the indicated effects when the marker-endpoint object is viewed, for example. The image extraction may be conducted by staring at the marker-endpoint object for the predetermined duration of time and then focusing on the object to be extracted and sent, all without any hand gestures or manual selection.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device adapted to be worn on the head of a first user, comprising:
- at least one camera;
- a memory that stores instructions; and
- a processor that executes the instructions to perform operations including:
- capturing, using the at least one camera, an image in an environment of the first user;
- identifying at least one physical marker in the captured image;
- determining that the at least one physical marker in the captured image has been within a field of view of the electronic eyewear device of the first user for a predetermined amount of time;
- when the at least one physical marker in the captured image has been within the field of view of the electronic eyewear device of the first user for the predetermined amount of time, capturing, using the at least one camera, a snapshot including an object associated with the at least one physical marker in the captured image; and
- sending at least one of the object upon extraction of the object from the snapshot, a prestored representation of the object, augmented reality content representing the object, or cloned visual content from real-world surroundings of the first user for display as an overlay on an electronic eyewear device of a second user when the second user or another object in a view of the electronic eyewear device of the second user is paired with the object associated with the at least one physical marker in the captured image.

2. The eyewear device of claim 1, wherein the processor executes further instructions to perform operations including, when the predetermined amount of time is greater than a first period of time, sending a simple abstract effect denoting user presence, and when the predetermined amount of time is greater than a second period of time greater than the first period of time, sending at least one of the object upon extraction of the object from the snapshot, the prestored representation of the object, the augmented reality content representing the object, or the cloned visual content from real-world surroundings of the first user.

3. The eyewear device of claim 2, wherein the processor executes further instructions to perform operations including, when the predetermined amount of time is greater than the second period of time, prompting the first user to at least one of take a snapshot, select the prestored representation of the object, select the augmented reality content representing the object, or select the cloned visual content from real-world surroundings of the first user.

4. The eyewear device of claim 1, further comprising an audio transceiver that receives audio input signals via a microphone and provides audio output signals via a speaker, wherein the processor executes further instructions to perform operations including capturing audio corresponding to the cloned visual content and sending the captured audio with the cloned visual content.

5. The eyewear device of claim 1, wherein the processor executes further instructions to perform operations including presenting a representation of a wormhole to a display of the first user and activating animation of the wormhole when the at least one physical marker in the captured image is in the field of view of the electronic eyewear device of the first user.

6. The eyewear device of claim 5, wherein the processor executes further instructions to perform operations including presenting a representation of a wormhole to a display of the first user and activating animation of the wormhole when the first user or another object in view of the electronic eyewear device of the first user is paired with an object associated with a physical marker in an image captured by the second user and the second user is sending or has sent at least one of a second object upon extraction of the second object from a snapshot taken by the second user, a prestored representation of the second object, augmented reality content representing the second object, or cloned visual content from real-world surroundings of the second user.

7. The eyewear device of claim 5, wherein the at least one physical marker in the captured image comprises a logo and the processor executes further instructions to perform operations including presenting the representation of the wormhole to the display of the first user and activating the wormhole when the logo is on a first product in the field of view of the electronic eyewear device of the first user and the at least one of the object upon extraction of the object from the snapshot, the prestored representation of the object, the augmented reality content representing the object, or the cloned visual content from real-world surroundings of the first user is being sent to a second user having a second product with the logo.

8. The eyewear device of claim 1, wherein the processor executes further instructions to perform operations including tracking global positioning coordinates of the object associated with the at least one physical marker during respective image captures and, when the object is moved between image captures, triggering the sending at least one of the object, a prestored representation of the object, augmented reality content representing the object, or cloned visual content from real-world surroundings of the first user to the electronic eyewear device of the second user.

9. The eyewear device of claim 1, wherein the processor executes further instructions to perform operations including sending at least one of a prestored image, a prestored audio clip, live video, or live audio to the electronic eyewear device of the second user each time the at least one physical marker in the captured image has been within the field of view of the electronic eyewear device of the first user for the predetermined amount of time.

10. A method of snapshot messaging using an electronic eyewear device of a first user, including:

capturing an image in an environment of the first user;

identifying at least one physical marker in the captured image;

determining that the at least one physical marker in the captured image has been within a field of view of the electronic eyewear device of the first user for a predetermined amount of time;

when the at least one physical marker in the captured image has been within the field of view of the electronic eyewear device of the first user for the predetermined amount of time, capturing a snapshot including an object associated with the at least one physical marker in the captured image; and sending at least one of the object upon extraction of the object from the snapshot, a prestored representation of the object, augmented reality content representing the object, or cloned visual content from real-world surroundings of the first user for display as an overlay on an electronic eyewear device of a second user when the second user or another object in a view of the electronic eyewear device of the second user is paired with the object associated with the at least one physical marker in the captured image.

11. The method of claim 10, further comprising, when the predetermined amount of time is greater than a first period of time, sending a simple abstract effect denoting user presence, and when the predetermined amount of time is greater than a second period of time greater than the first period of time, sending at least one of the object upon extraction of the object from the snapshot, the prestored representation of the object, the augmented reality content representing the object, or the cloned visual content from real-world surroundings of the first user.

12. The method of claim 11, further comprising, when the predetermined amount of time is greater than the second period of time, prompting the first user to at least one of take a snapshot, select the prestored representation of the object, select the augmented reality content representing the object, or select the cloned visual content from real-world surroundings of the first user.

13. The method of claim 10, further comprising capturing audio corresponding to the cloned visual content and sending the captured audio with the cloned visual content.

14. The method of claim 10, further comprising presenting a representation of a wormhole to a display of the first user and activating animation of the wormhole when the at least one physical marker in the captured image is in the field of view of the electronic eyewear device of the first user.

15. The method of claim 14, further comprising presenting a representation of a wormhole to a display of the first user and activating animation of the wormhole when the first user or another object in view of the electronic eyewear device of the first user is paired with an object associated with a physical marker in an image captured by the second user and the second user is sending or has sent at least one of a second object upon extraction of the second object from a snapshot taken by the second user, a prestored representation of the second object, augmented reality content representing the second object, or cloned visual content from real-world surroundings of the second user.

16. The method of claim 14, wherein the at least one physical marker in the captured image comprises a logo, further comprising presenting the representation of the wormhole to the display of the first user and activating the wormhole when the logo is on a first product in the field of view of the electronic eyewear device of the first user and the at least one of the object upon extraction of the object from the snapshot, the prestored representation of the object, the augmented reality content representing the object, or the cloned visual content from real-world surroundings of the first user is being sent to a second user having a second product with the logo.

17. The method of claim 10, further comprising tracking global positioning coordinates of the object associated with the at least one physical marker during respective image captures and, when the object is moved between image captures, triggering the sending at least one of the object, a prestored representation of the object, augmented reality content representing the object, or cloned visual content from real-world surroundings of the first user to the electronic eyewear device of the second user.

18. The method of claim 10, further comprising sending at least one of a prestored image, a prestored audio clip, live video, or live audio to the electronic eyewear device of the second user each time the at least one physical marker in the captured image has been within the field of view of the electronic eyewear device of the first user for the predetermined amount of time.

19. A non-transitory computer-readable storage medium that stores instructions that when executed by at least one processor cause the at least one processor to provide a snapshot message using an electronic eyewear device of a first user by performing operations including:

capturing an image in an environment of the first user;

identifying at least one physical marker in the captured image;

determining that the at least one physical marker in the captured image has been within a field of view of the electronic eyewear device of the first user for a predetermined amount of time;

when the at least one physical marker in the captured image has been within the field of view of the electronic eyewear device of the first user for the predetermined amount of time, capturing a snapshot including an object associated with the at least one physical marker in the captured image; and sending at least one of the object upon extraction of the object from the snapshot, a prestored representation of the object, augmented reality content representing the object, or cloned visual content from real-world surroundings of the first user for display as an overlay on an electronic eyewear device of a second user when the second user or another object in a view of the electronic eyewear device of the second user is paired with the object associated with the at least one physical marker in the captured image.

20. The storage medium of claim 19, further comprising, instructions that when executed by the at least one processor cause the at least one processor to perform operations including, when the predetermined amount of time is greater than a first period of time, sending a simple abstract effect denoting user presence, and when the predetermined amount of time is greater than a second period of time greater than the first period of time, sending at least one of the object upon extraction of the object from the snapshot, the prestored representation of the object, the augmented reality content representing the object, or the cloned visual content from real-world surroundings of the first user.

* * * * *